(12) United States Patent
Abe et al.

(10) Patent No.: US 11,046,315 B2
(45) Date of Patent: Jun. 29, 2021

(54) DRIVING FORCE CONTROL APPARATUS

(71) Applicant: TOYOTA JIDOSHA KABUSHIKI KAISHA, Toyota (JP)

(72) Inventors: Yuta Abe, Toyota (JP); Yoshikatsu Oda, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 46 days.

(21) Appl. No.: 16/676,900

(22) Filed: Nov. 7, 2019

(65) Prior Publication Data

US 2020/0263787 A1 Aug. 20, 2020

(30) Foreign Application Priority Data

Feb. 20, 2019 (JP) .............................. JP2019-028536

(51) Int. Cl.
*B60W 30/18* (2012.01)
*B60W 50/00* (2006.01)

(52) U.S. Cl.
CPC ...... *B60W 30/18045* (2013.01); *B60W 50/00* (2013.01); *B60W 50/0098* (2013.01); *B60W 2050/0011* (2013.01); *B60W 2050/0022* (2013.01); *B60W 2050/0026* (2013.01); *B60W 2540/10* (2013.01)

(58) Field of Classification Search
CPC ..... B60W 30/18045; B60W 30/18036; B60W 50/0098; B60W 2050/0011; B60W 2050/0022; B60W 2050/0026; B60W 10/04–18; B60W 2540/10–106
See application file for complete search history.

(56) References Cited

U.S. PATENT DOCUMENTS

| 5,323,667 | A | * | 6/1994 | Tweed | B60W 30/1819 477/107 |
| 8,888,656 | B2 | * | 11/2014 | Kawamura | B60W 50/10 477/120 |
| 10,730,519 | B2 | * | 8/2020 | Koide | F16H 61/16 |
| 2020/0331474 | A1 | * | 10/2020 | Oda | B60W 40/076 |

FOREIGN PATENT DOCUMENTS

JP 2014-088067 A 5/2014

\* cited by examiner

*Primary Examiner* — Erin D Bishop
(74) *Attorney, Agent, or Firm* — Hunton Andrews Kurth LLP

(57) ABSTRACT

A controller of a driving force control apparatus starts shift-change-timing restrain control to limit operation driving force at a timing when a starting condition including a condition that a shift position has changed when an accelerator pedal is in an operating state becomes satisfied, and performs reverse-timing restrain control to limit the operation driving force when a performing condition including a condition that the accelerator pedal is in the operating state as well as the shift position is in a reverse position is satisfied. When a specific operation is performed during the shift-change-timing restrain control being performed, the controller moderates a degree of the limitation to the operation driving force in the shift-change-timing restrain control or stops this control. When the specific operation is performed during the reverse-timing restrain control being performed, the controller maintains a degree of the limitation to the operation driving force in the reverse-timing restrain control.

3 Claims, 13 Drawing Sheets

DRIVING FORCE CONTROL APPARATUS

CROSS-REFERENCE TO RELATED APPLICATION

The present application claims priority to Japanese Patent Application No. 2019-028536 filed on Feb. 20, 2019, which is incorporated herein by reference in its entirety.

TECHNICAL FIELD

The present invention relates to a driving force control apparatus for controlling driving force (operation driving force) applied to a vehicle based on an accelerator pedal operation by a driver.

BACKGROUND ART

A driving force control apparatus has been conventionally known, this apparatus being configured to add a limitation to operation driving force (to restrain operation driving force) when the operation driving force becomes too large for a purpose of avoiding an occurrence of a situation where a vehicle rapidly accelerates or rapidly starts due to an erroneous operation of an accelerator pedal by a driver. Such control is called "driving force restrain control". The driving force restrain control includes shift-change-timing restrain control and reverse-timing restrain control.

The shift-change-timing restrain control is started, for example, from a timing when a starting condition becomes satisfied, the starting condition being a condition that a shift position has changed in accordance with a predetermined pattern when the accelerator pedal is in an operating state. The shift-change-timing restrain control is terminated, for example, when the accelerator pedal falls into a non-operating state. The shift-change-timing restrain control makes it possible to, for example, avoid an occurrence of a situation where the vehicle rapidly starts when the driver has erroneously changed the shift position with the accelerator pedal depressed.

The reverse-timing restrain control is performed when the accelerator pedal is in the operating state as well as the shift position is in a reverse position. The reverse-timing restrain control enables to avoid an occurrence of a situation where the vehicle rapidly accelerates when the driver has erroneously depressed the accelerator pedal deep at a reverse timing.

There may be a case where the vehicle becomes stuck when travelling on a muddy road, a snowy road, or the like. In this case, the driver attempts to have the vehicle escape from a stuck place by frequently changing the shift position between a driving position and the reverse position, maintaining the accelerator pedal in the operating state. In such a case, if the shift-change-timing restrain control and the reverse-timing restrain control are performed, it is likely that the driving force applied to the vehicle may not be enough.

Therefore, the conventional apparatus is configured to stop the driving force restrain control or lesson a degree of the restraint of the operation driving force by the driving force restrain control (that is, moderate a degree of the limitation to the operation driving force) when a specific operation is performed (refer to Japanese Patent Application Laid-Open (kokai) No. 2014-088067, for example).

It should be noted that the Japanese Patent Application Laid-Open (kokai) No. 2014-088067 describes that the specific operation is an operation other than an operation of the accelerator pedal and is an operation indicating that the driver has an intention to accelerate the vehicle, the operation including an operation of a switch for invalidating a function of traction control, an operation of a switch for invalidating a function of vehicle stability control (VSC), and an operation of a switch for setting a sub transmission to a low gear side.

SUMMARY OF THE INVENTION

However, the above mentioned conventional apparatus lessons the degree of restraint of both of the shift-change-timing restrain control and the reverse-timing restrain control when the above mentioned specific operation has been detected. Therefore, for example, if the shift position is in the reverse position at a timing when the vehicle has escaped from a stuck place, it is highly likely that the vehicle rapidly accelerates backward.

The present invention is made to resolve the problem above. That is, one of objects of the present invention is to provide a driving force control apparatus capable of reducing a possibility that a travelling performance of a vehicle is degraded as well as ensuring safety at a reverse timing.

A driving force control apparatus according to the present invention (hereinafter, also referred to as a "present invention apparatus") comprises;

a driving force generating apparatus (20) configured to generate driving force applied to a vehicle; and a controller (10) configured to control the driving force by controlling the driving force generating apparatus (20).

The controller (10) is configured to;

start shift-change-timing restrain control to control the driving force generating apparatus (20) in such a manner that the driving force generating apparatus (20) generates driving force at a timing when a starting condition (a first condition) becomes satisfied, the driving force being obtained by adding a limit to operation driving force determined based on an operation amount of an accelerator pedal of the vehicle so that the operation driving force does not exceed shift-change-timing target driving force (SCFtgt), wherein the starting condition (the first condition) includes a condition that a shift position of the vehicle has changed in accordance with a predetermined pattern including a pattern where the shift position changes from a position other than a reverse position to the reverse position in a case when the accelerator pedal is in an operating state and a pattern where the shift position changes from a position other than a driving position to the driving position in a case when the accelerator pedal is in the operating state, perform reverse-timing restrain control to control the driving force generating apparatus (20) in such a manner that the driving force generating apparatus (20) generates driving force when a performing condition (a third condition) is satisfied, the driving force being obtained by adding a limit to the operation driving force so that the operation driving force does not exceed reverse-timing target driving force (RFtgt), wherein the performing condition (a third condition) includes a condition that the accelerator pedal is in the operating state as well as the shift position is in the reverse position, when a predetermined specific operation is performed by a driver of the vehicle, the specific operation being other than an operation of the accelerator pedal in a case when the shift-change-timing restrain control is being performed, moderate a degree of the limitation to the operation driving force in the shift-change-timing restrain control by increasing the shift-change-timing target driving force (SCFtgt) or stop the shift-change-timing restrain control; and when the specific operation is performed by the driver in a case when the reverse-timing restrain control is being performed, maintain a degree of the limitation to the operation driving force in the reverse-timing restrain control.

According to the present invention apparatus, when the specific operation is performed by the driver of the vehicle in a case when the shift-change-timing restrain control is being performed, the degree of the limitation to the operation driving force in the shift-change-timing restrain control is moderated or the shift-change-timing restrain control is stopped. Therefore, at least in following cases where "the shift-change-timing restrain control is started by the shift position having changed in accordance with a pattern where the shift position changes from a position other than the driving position to the driving position" or "the degree of the limitation to the operation driving force in the shift-change-timing restrain control is moderated in a case when this control is started by the shift position having changed in accordance with a pattern where the shift position changes from a position other than the reverse position to the reverse position", the driver can obtain larger driving force compared to a case where the shift-change-timing restrain control is being performed without the specific operation not being performed. Hence, the performing of the specific operation makes it possible to reduce a possibility that a travelling performance of the vehicle is degraded.

On the other hand, according to the present invention apparatus, when the reverse-timing restrain control is being performed, the degree of the limitation to the operation driving force in the reverse-timing restrain control is maintained even though the specific operation is performed by the driver. In addition, in a case where "the degree of the limitation to the operation driving force in the shift-change-timing restrain control is moderated in a case when this control is started by the shift position having changed in accordance with a pattern where the shift position changes from a position other than the reverse position to the reverse position", the degree of the limitation to the operation driving force is moderated, yet the limitation itself to the operation driving force is performed. Therefore, a possibility that the vehicle rapidly accelerates or rapidly starts at the reverse timing can be reduced in either cases and thereby safety at the reverse timing can be ensured.

Therefore, according to the present invention apparatus, a possibility that a travelling performance of the vehicle is degraded can be reduced as well as safety at the reverse timing can be ensured.

In another aspect of the present invention, the controller (10) is configured to stop the shift-change-timing restrain control when the specific operation is performed in a case when both of the shift-change-timing restrain control and the reverse-timing restrain control are being performed, and the controller (10) is further configured to;

calculate the operation driving force as target operation driving force (NOFtgt), calculate the shift-change-timing target driving force (SCFtgt) using a parameter indicating an acceleration condition of the vehicle, calculate the reverse-timing target driving force (RHFtgt) using the parameter, when both of the shift-change-timing restrain control and the reverse-timing restrain control are being performed, select smallest driving force as final target driving force (FLFtgt), the smallest driving force being selected from among the target operation driving force (NOFtgt), the shift-change-timing target driving force (SCFtgt), and the reverse-timing target driving force (RHFtgt), when the reverse-timing target driving force (RHFtgt) is larger than the shift-change-timing target driving force (SCFtgt) at a switching timing at which the specific operation has been performed, calculate gradual change target driving force (ZFtgt) which gradually increases from the shift-change-timing target driving force (SCFtgt) at the switching timing with lapse of time and during a period from the switching timing to a reaching timing at which the gradual change target driving force (ZFtgt) has reached reverse-timing target driving force (RHFtgt) successively calculated using the parameter, select smaller driving force among the target operation driving force (NOFtgt) and the gradual change target driving force (ZFtgt) as final target driving force (FLFtgt), after the reaching timing, select smaller driving force as final target driving force (FLFtgt), the smaller driving force being selected from among the target operation driving force (NOFtgt) and the reverse-timing target driving force (RHFtgt) successively calculated using the parameter; and control the driving force generating apparatus (20) in such a manner that driving force generated by the driving force generating apparatus (20) matches with the selected final target driving force (FLFtgt).

"The case where both of the shift-change-timing restrain control and the reverse-timing restrain control are being performed" means a "case where the shift-change-timing restrain control is started by the shift position having changed in accordance with a pattern where the shift position changes from a position other than the reverse position to the reverse position and thereafter, the performing condition of the reverse-timing restrain control becomes also satisfied by continuing the reverse action". According to the above aspect of the present invention, at a timing when the specific operation is performed in such a case (that is, at the switching timing), the shift-change-timing restrain control is stopped and therefore the reverse-timing restrain control is performed. At this time, if a relationship of "reverse-timing target driving force> shift-change-timing target driving force" is satisfied at the switching timing, the gradual change target driving force (driving force which gradually increases from the shift-change-timing target driving force at the switching timing with lapse of time) is calculated. The gradual change target driving force is calculated until the reaching timing at which the gradual change target driving force has reached reverse-timing target driving force successively calculated using the parameter (that is, the latest reverse-timing target driving force). Thus, a possibility that the final target driving force rapidly increases from the shift-change-timing target driving force to the reverse-timing target driving force due to the relationship of "reverse-timing target driving force> shift-change-timing target driving force" being satisfied at the switching timing can be significantly reduced. In other words, the final target driving force increases in a smooth manner during the period from the switching timing to the reaching timing. As a result, a possibility that the vehicle rapidly accelerates at the switching timing can be largely reduced.

In another aspect of the present invention,
the controller (10) is configured to;
calculate driving force as the shift-change-timing target driving force (SCFtgt) in accordance with feedback control where first control gains (K1SC, K2SC, K3SC) are used, the driving force being to be applied to the vehicle in order to match an actual value (Ga) of the parameter with a shift-change-timing target parameter (GtgtS) calculated in the shift-change-timing restrain control,
calculate driving force as the reverse-timing target driving force (RFtgt (RHFtgt)) in accordance with feedback control where second control gains (K1R, K2R, K3R) are used, the driving force being to be applied to the vehicle in order to match an actual value (Ga) of the parameter with a reverse-timing target parameter (GtgtR) calculated in the reverse-timing restrain control; and
when the shift-change-timing target parameter (GtgtS) and the reverse-timing target parameter (GtgtR) are equal with each other in a case when the reverse-timing target driving force (RFtgt (RHFtgt)) is less than or equal to the shift-change-timing target driving force (SCFtgt) at the switching timing, calculate driving force as the reverse-timing target driving force (RFtgt (RYFtgt)) in accordance with feedback control where the first control gains (K1SC, K2SC, K3SC) are used in place of the second control gains (K1R, K2R, K3R), the driving force being to be applied to the vehicle in order to match the actual value (Ga) of the parameter with the reverse-timing target parameter (GtgtR) after the switching timing.

When the shift-change-timing target parameter and the reverse-timing target parameter are equal to each other in a case where the reverse-timing target driving force is less than or equal to the shift-change-timing target driving force at the switching timing, switching of the control gains of the feedback control from the first control gains to the second control gains may cause severe fluctuation of the driving force of the vehicle. In contrast, according to the above aspect of the present invention, when the shift-change-timing target parameter and the reverse-timing target parameter are equal to each other in a case where the reverse-timing target driving force is less than or equal to the shift-change-timing target driving force at the switching timing, the reverse-timing target driving force is calculated in accordance with the feedback control where the first control gains are used in place of the second control gains. Therefore, a possibility that the driving force largely fluctuates due to the switching of the control gains can be significantly reduced.

In the above description, references used in the following descriptions regarding embodiments are added with parentheses to the elements of the present invention, in order to assist in understanding the present invention. However, those references should not be used to limit the scope of the invention.

DESCRIPTION OF THE EMBODIMENT

First Embodiment (Configuration)

Figure 1:
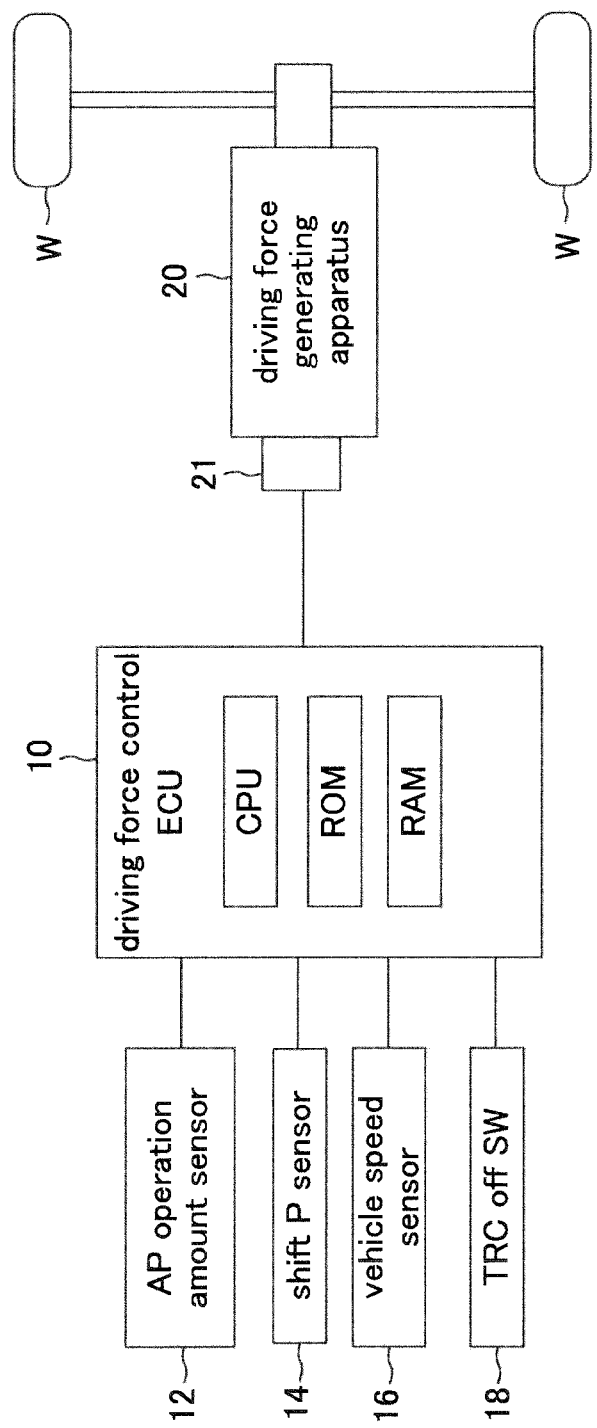
FIG. 1 is a schematic configuration diagram of a driving force control apparatus according to a first embodiment of the present invention (hereinafter, referred to as a "first embodiment apparatus").

Hereinafter, a driving force control apparatus according to a first embodiment of the present invention (hereinafter, also referred to as a "first embodiment apparatus") will be described, referring to figures. The first embodiment apparatus is applied to a vehicle. As shown in FIG. 1, the first embodiment apparatus comprises a driving force control ECU 10 (hereinafter, also simply referred to as "ECU 10").

ECU is an abbreviation of Electric Control Unit. The ECU 10 is an electronic control circuit comprising a microcomputer as a main component parts, the microcomputer including CPU, ROM, RAM, interfaces, and the like. The CPU realizes/performs various functions (mentioned later) by executing instructions (i.e. routines) stored in the ROM. Further, the ROM stores in advance various types of constant values, look-up tables and the like (mentioned later).

The ECU 10 is connected to an actuator 21 of a driving force generating apparatus 20 of the vehicle. The driving force generating apparatus 20 is a known driving apparatus of a hybrid vehicle. That is, the driving force generating apparatus 20 comprises a driving source including an internal-combustion engine and a motor as well as a driving mechanism including a gear device. The ECU 10 controls the actuator 21 so as to change torque generated by the driving source. The torque generated by the driving source is transmitted to driving wheels W via the driving mechanism as driving force of the vehicle. It should be noted that the present specification assumes that the torque generated by the driving source is transmitted to the driving wheels W without being subject to torque conversion by the driving mechanism. Therefore, torque generated by the driving source is equivalent to driving force applied to the driving wheels W (driving force of the vehicle). The driving mechanism can change the driving force transmitted to the driving wheels W into driving force with a direction of making the vehicle move forward and driving force with a direction of making the vehicle move backward.

Following sensors and switch are connected to the ECU 10, the sensors and the switch being an accelerator pedal operation amount sensor 12, a shift position sensor 14, a vehicle speed sensor 16, and a traction control off switch 18. The ECU 10 receives signals (detection signals) generated by these sensors and switch (12-18) every time a predetermined time elapses. Hereinafter, the shift position sensor 14 and the traction control (TRC: TRaction Control) off switch 18 will be also referred to as a "shift P sensor 14" and a "TRC off SW 18", respectively.

The accelerator pedal operation amount sensor 12 detects an operation amount of an accelerator pedal (illustration omitted) of the vehicle to generate a signal indicating this operation amount (hereinafter, referred to as an "accelerator pedal operation amount") AP. When the accelerator pedal operation amount AP is more than or equal to an accelerator pedal operation amount threshold APth having a predetermined positive value, the ECU 10 determines that the accelerator pedal is in an operating state. When the accelerator pedal operation amount AP is less than the predetermined accelerator pedal operation amount threshold APth, the ECU 10 determines that the accelerator pedal is in a non-operating state.

The shift P sensor 14 detects a shift position of a shift lever (illustration omitted) to generate a signal Ps indicating this shift position. The shift position Ps is a position corresponding to each of a plurality of ranges mentioned below. The ECU 10 controls the actuator 21 based on the shift position Ps to set a transmission state of driving force as follows.

P range (parking range): When the shift position Ps is in a position corresponding to a P range (hereinafter, referred to as a "P position" or a "parking position"), a state of the driving mechanism is set to a parking state. In this case, the driving wheels W are mechanically locked, and the driving force generated by the driving force generating apparatus 20 is not transmitted to the driving wheels W.

N range (neutral range): When the shift position Ps is in a position corresponding to a N range (hereinafter, referred to as a "N position" or a "neutral position"), a state of the driving mechanism is set to a neutral state. In this case, although the driving wheels W are rotatable, the driving force generated by the driving force generating apparatus 20 is not transmitted to the driving wheels W.

D range (driving range): When the shift position Ps is in a position corresponding to a D range (hereinafter, referred to as a "D position" or a "driving position"), a state of the driving mechanism is set to a driving force transmittable state. In this case, the driving force with a direction of making the vehicle move forward is transmitted to the driving wheels W.

R range (reverse range): When the shift position Ps is in a position corresponding to an R range (hereinafter, referred to as an "R position" or a "reverse position"), a state of the driving mechanism is set to the driving force transmittable state. In this case, the driving force with a direction of making the vehicle move backward is transmitted to the driving wheels W.

The vehicle speed sensor 16 generates one pulse every time an output shaft of the driving force generating apparatus 20 coupled to the driving wheels W rotates by a predetermined angle. The ECU 10 counts number of generation of the pulses per unit time $\Delta t$ and obtains vehicle speed V based on this counted value. Therefore, the vehicle speed V is obtained as a positive value regardless of the vehicle moving forward or backward. Further, the ECU 10 detects an actual acceleration Ga of the vehicle by subtracting a vehicle speed Vold before the unit time $\Delta t$ from a latest (current) vehicle speed V and dividing the subtracted value by the unit time $\Delta t$ ($Ga=(V-Vold)/\Delta t$).

The TRC off SW 18 is a switch arranged in the vicinity of a driver's seat and operated by passengers of the vehicle (typically, a driver). Traction control is a type of control to stabilize a behavior of the vehicle where the driving force transmitted to the driving wheels W is reduced so that the driving wheels do not idle (race) (or so that an acceleration slip amount of the driving wheels does not become too large) when the vehicle starts or accelerates. Once the TRC off SW 18 is pressed by a passenger to become in a pressed state, the TRC off SW 18 thereafter maintains this pressed state even though the passenger is not pressing the TRC off SW 18. The TRC off SW 18 becomes in a non-pressed state when being further pressed by the passenger in a case of its being in the pressed state and thereafter maintains this non-pressed state even though the passenger is not pressing the TRC off SW 18.

When the TRC off SW 18 is in the non-pressed state, the ECU 10 is capable of performing the traction control. When the TRC off SW 18 is in the pressed state, the ECU 10 does not perform the traction control (That is, the ECU 10 invalidates a function of the traction control).

Since the traction control is a function to ensure safety of a traveling vehicle, it may not happen in most cases that the TRC off SW 18 is set to the pressed state during driving. However, when the vehicle becomes stuck in a muddy road, a snowy road, or the like, for example, restraint of idling (racing) of the driving wheels by the traction control may rather prevent the vehicle from escaping from a stuck place. Therefore, in this case, the passenger may set the TRC off SW 18 to the pressed state to invalidate the function of the traction control.

When a specific condition (mentioned later) is satisfied in a case where the vehicle becomes stuck in a muddy road, a snowy road, or the like for instance, the ECU 10 stops (prohibits) driving force restrain control at a shift-change-timing (mentioned later) whereas does not stop (prohibit) driving force restrain control at a reverse-timing. Thereby, a possibility that performance of escaping from a muddy road, a snowy road, or the like is degraded can be reduced as well as safety at the reverse-timing can be ensured. A detailed description will be made below.

(Operation Detail)

1. Target Operation Driving Force

The ECU 10 calculates target driving force based on accelerator pedal operation amount AP and vehicle speed V. Since this target driving force is determined based on operation of the accelerator pedal by the driver, hereinafter, the target driving force will be referred to as "target operation driving force NOFtgt". As mentioned later, when neither reverse-timing restrain control nor shift-change-timing restrain control is being performed, the ECU 10 controls the actuator 21 in such a manner that the driving force transmitted to the driving wheels W matches with the target operation driving force NOFtgt. It should be noted that the ECU 10 obtains the target operation driving force NOFtgt by applying the accelerator pedal operation amount AP and the vehicle speed V to a look-up table MapNOFtgt (AP, V) (illustration omitted) regulating a relationship between the accelerator pedal operation amount AP and a throttle opening for every vehicle speed.

In addition, the ECU 10 performs "driving force restrain control at the shift-change-timing and driving force restrain control at the reverse-timing" mentioned below and thereby controls (restrains) the driving force transmitted to the driving wheels W in order to avoid rapid acceleration and/or rapid start of the vehicle due to erroneous operation of the accelerator pedal by the driver.

More specifically, the ECU 10, as will be described below, calculates shift-change-timing target driving force SCFtgt when the driving force restrain control at the shift-change-timing is performed and calculates reverse-timing target driving force RFtgt when the driving force restrain control at the reverse-timing is performed. Thereafter, the ECU 10 selects smallest driving force among the target operation driving force NOFtgt, the shift-change-timing target driving force SCFtgt, and the reverse-timing target driving force RFtgt as final target driving force FLFtgt and controls the actuator 21 in such a manner that actual driving force matches with the final target driving force FLFtgt.

It should be noted that in a case when the driving force restrain control at the shift-change-timing is being performed but the driving force restrain control at the reverse-timing is not being performed, the ECU 10 selects smaller driving force among the target operation driving force NOFtgt and the shift-change-timing target driving force SCFtgt as the final target driving force FLFtgt.

Similarly, in a case when the driving force restrain control at the reverse-timing is being performed but the driving force restrain control at the shift-change-timing is not being performed, the ECU 10 selects smaller driving force among the target operation driving force NOFtgt and the reverse-timing target driving force RFtgt as the final target driving force FLFtgt.

2. Driving Force Restrain Control at the Shift-Change-Timing

The driving force restrain control at the shift-change-timing may be referred to as "SC restrain control". When a first condition mentioned below becomes satisfied, the ECU 10 starts the SC restrain control. Therefore, the first condition is an SC restrain control starting condition. The first condition is satisfied when both of a condition A1 and a condition A2 mentioned below are satisfied.

(First Condition: SC Restrain Control Starting Condition)

Condition A1: The accelerator pedal is in the operating state (that is, the accelerator pedal operation amount AP≥ the accelerator pedal operation amount threshold APth).

Condition A2: The shift position Ps has changed in accordance with any one of a (pattern 1) to a (pattern 5) shown below.

(Pattern 1) a pattern to change from the P position to the R position (Pattern 2) a pattern to change from the N position to the R position (Pattern 3) a pattern to change from the P position to the D position (Pattern 4) a pattern to change from the D position to the R position (Pattern 5) a pattern to change from the R position to the D position For example, the first condition is satisfied when, under a state where the accelerator pedal is being depressed, the driver moves the shift lever from the D position to the R position or from the R position to the D position.

Further, even though the first condition (the SC restrain control starting condition) is satisfied, the ECU 10 does not start the SC restrain control if the specific condition (prohibition condition) that the TRC off SW 18 is in the pressed state is satisfied.

When a second condition mentioned below is satisfied, the ECU 10 terminates the SC restrain control. Therefore, the second condition is an SC restrain control termination condition. The second condition is satisfied when at least either one of a condition B1 or a condition B2 shown below is satisfied.

(Second Condition: SC Restrain Control Termination Condition)

Condition B1: The accelerator pedal has changed from in the operating state to in the non-operating state (That is, the accelerator pedal operation amount AP has changed from more than or equal to the threshold APth to less than the threshold APth.).

Condition B2: The shift position Ps has changed to a shift position different from a shift position at a start timing of the SC restrain control.

It should be noted that when the second condition becomes satisfied by the above condition B2 being satisfied in a case where the accelerator pedal is in the operating state, there may be a case where the above condition A2 becomes simultaneously satisfied and thereby the first condition becomes satisfied. In this case, the SC restrain control will be continued (Strictly, the SC restrain control with the currently performed pattern is tentatively terminated, and the SC restrain control with a new pattern will be subsequently started).

(Calculation of the Shift-Change-Timing Target Driving Force SCFtgt)

The ECU 10 obtains shift-change-timing target acceleration (SC target acceleration, SC upper limit acceleration) GtgtS by applying the vehicle speed V to a shift-change-timing target acceleration look-up table MapS(V) regulating a relationship between the vehicle speed V and the SC target acceleration GtgtS.

Figure 2A:
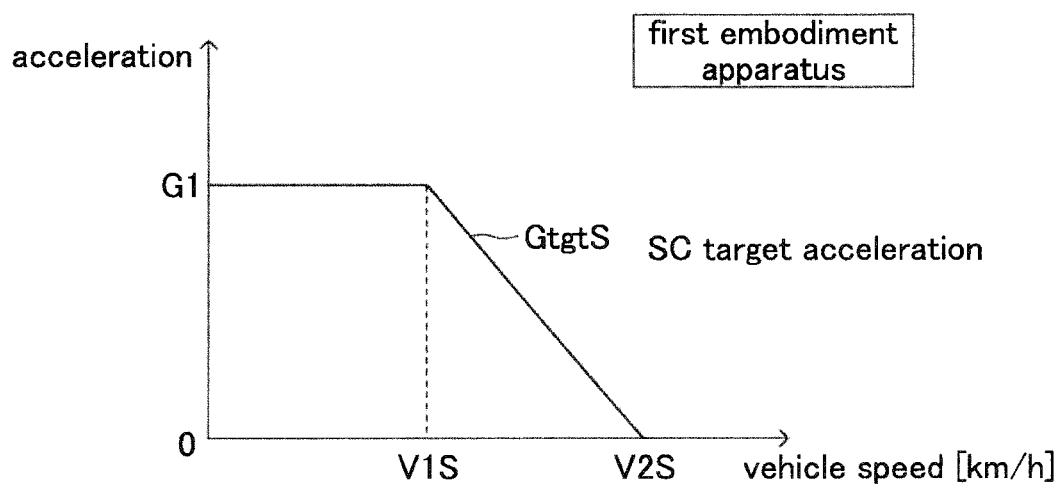
FIG. 2A is a diagram showing a shift-change-timing target acceleration look-up table regulating a relationship between vehicle speed and shift-change-timing target acceleration.

FIG. 2A shows one example of the table MapS(V). According to this table MapS(V), when the vehicle speed V is in a range between more than or equal to zero and less than a first vehicle speed V1S, the SC target acceleration GtgtS is set to a predetermined first acceleration G1. Further, when the vehicle speed V is in a range between more than or equal to the first vehicle speed V1S and less than a second vehicle speed V2S, the SC target acceleration GtgtS linearly decreases from the first acceleration G1 to zero as the vehicle speed V increases. When the vehicle speed is in a range more than or equal to the second vehicle speed V2S, the SC target acceleration GtgtS is set to zero.

The ECU 10 calculates, based on the aforementioned actual acceleration Ga, the SC target acceleration GtgtS, and the like, driving force necessary for matching the actual acceleration Ga with the SC target acceleration GtgtS as target driving force at the shift-change-timing (hereinafter, will be referred to as "SC target driving force") SCFtgt. It should be noted that in the present embodiment, in a case when the SC restrain control is not being performed, the ECU 10 sets the SC target driving force SCFtgt to a "significantly large value which is normally improbable".

More specifically, the ECU 10 calculates the SC target driving force SCFtgt based on PID control in accordance with a following expression (1).

$$SCFtgt = MapSCFF(GtgtS, V) + K1SC \cdot \Delta Gs + K2SC \cdot \Sigma \Delta Gs + K3SC \cdot d\Delta Gs/dt \quad (1)$$

In the above expression (1), MapSCFF(GtgtS, V) is a look-up table regulating a relationship between "the SC target acceleration GtgtS and the vehicle speed V" and "a feedforward amount SCFF of the SC target driving force SCFtgt". The feedforward amount SCFF is driving force (actually, torque which the driving force generating apparatus 20 should generate) to be applied to the driving wheels W in order to match the actual acceleration Ga of the vehicle with the SC target acceleration GtgtS in a case when the vehicle is traveling on a dry asphalt road surface at the vehicle speed V.

In the above expression (1), ΔGs is a value (an acceleration deviation) obtained by subtracting the actual acceleration Ga from the SC target acceleration GtgtS (ΔGs=GtgtS−Ga). ΣΔGs is an integrated value of ΔGs. dΔGs/dt is a differential value of ΔGs.

K1SC is a control gain (constant value) of a proportional term.

K2SC is a control gain (constant value) of an integral term.

K3SC is a control gain (constant value) of a differential term.

3. Driving Force Restrain Control at the Reverse-Timing

The driving force restrain control at the reverse-timing may be referred to as "R restrain control". The ECU 10 performs the R restrain control when a third condition mentioned below is satisfied and does not perform the R restrain control when the third condition is not satisfied. Therefore, the third condition is a performing condition of the R restrain control as well as a starting condition and a termination condition of the R restrain control.

(Third Condition: R Restrain Control Performing Condition)

The third condition becomes satisfied when both of a condition C1 and a condition C2 mentioned below become satisfied.

Condition C1: The accelerator pedal is in the operating state (that is, the accelerator pedal operation amount AP≥ the accelerator pedal operation amount threshold APth).

Condition C2: The shift position Ps is in the R position.

For example, the third condition becomes satisfied when the driver falsely depresses the accelerator pedal, not a brake pedal in a case when the shift position is in the R position.

The R restrain control includes following two types of controls, that is, main R restrain control and preliminary R restrain control. The ECU 10 performs the main R restrain control when the SC restrain control is not being performed at a timing immediately before the third condition becomes satisfied. The ECU 10 performs the preliminary R restrain control when the SC restrain control is being performed at a timing immediately before the third condition becomes satisfied, as described later.

3. 1: Main R Restrain Control (Calculation of the Reverse-Timing Target Driving Force RFtgt)

The ECU 10 obtains reverse-timing target acceleration (R target acceleration, R upper limit acceleration) GtgtR by applying the vehicle speed V to a reverse-timing target acceleration look-up table MapR(V) regulating a relationship between the vehicle speed V and the R target acceleration GtgtR.

Figure 2B:
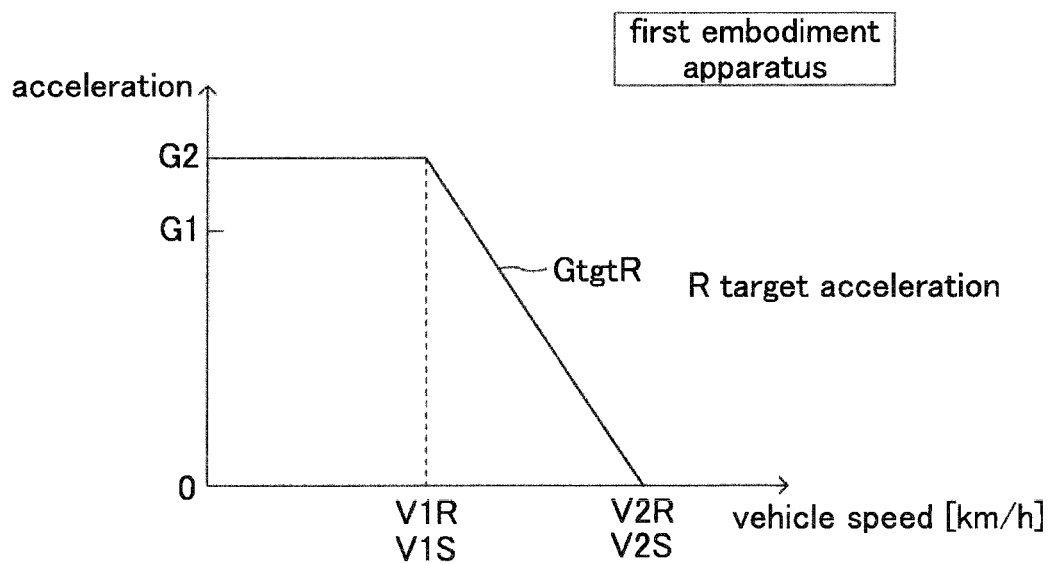
FIG. 2B is a diagram showing a reverse-timing target acceleration look-up table regulating a relationship between the vehicle speed and reverse-timing target acceleration.

FIG. 2B shows one example of the table MapR(V). According to this table MapR(V), when the vehicle speed V is in a range between more than or equal to zero and less than a first vehicle speed V1R, the R target acceleration GtgtR is set to a predetermined second acceleration G2. Further, when the vehicle speed V is in a range between more than or equal to the first vehicle speed V1R and less than a second vehicle speed V2R, the R target acceleration GtgtR linearly decreases from the second acceleration G2 to zero as the vehicle speed V increases. When the vehicle speed is in a range more than or equal to the second vehicle speed V2R, the R target acceleration GtgtR is set to zero.

In the present embodiment, the second acceleration G2 is larger than the first acceleration G1, the first vehicle speed V1R is equal to the first vehicle speed V1S, and the second vehicle speed V2R is equal to the second vehicle speed V2S. Therefore, when the vehicle speed is in a range between more than or equal to zero and less than the second vehicle speed V2R(=V2S), the R target acceleration GtgtR is always larger than the SC target acceleration GtgtS. Further, when the vehicle speed is in a range more than or equal to the second vehicle speed V2R(=V2S), the R target acceleration GtgtR and the SC target acceleration GtgtS are equal with each other (They are both "0").

The ECU 10 calculates, based on the aforementioned actual acceleration Ga, the R target acceleration GtgtR, and the like, driving force necessary for matching the actual acceleration Ga with the R target acceleration GtgtR as target driving force at the reverse-timing (hereinafter, will be referred to as "main R target driving force") RHFtgt. It should be noted that in the present embodiment, in a case when the main R restrain control is not being performed, the ECU 10 sets the main R target driving force RHFtgt to a "significantly large value which is normally improbable". The ECU 10 adopts the main R target driving force RHFtgt as R target driving force RFtgt by the R restrain control.

More specifically, the ECU 10 calculates the main R target driving force RHFtgt based on the PID control in accordance with a following expression (2).

$$RHFtgt = MapHRFF(GtgtR, V) + K1R \cdot \Delta Gr + K2R \cdot \Sigma \Delta Gr + K3R \cdot d\Delta Gr/dt \quad (2)$$

In the above expression (2), MapHRFF(GtgtR, V) is a look-up table regulating a relationship between "the R target acceleration GtgtR and the vehicle speed V" and "a feedforward amount HRFF of the main R target driving force RHFtgt". The feedforward amount HRFF is driving force (actually, torque which the driving force generating apparatus 20 should generate) to be applied to the driving wheels W in order to match the actual acceleration Ga of the vehicle with the R target acceleration GtgtR in a case when the vehicle is traveling on a dry asphalt road surface at the vehicle speed V. Therefore, when the vehicle speed V is a certain vehicle speed as well as when the R target acceleration GtgtR and the SC target acceleration GtgtS are equal with each other, the feedforward amount HRFF and the feedforward amount SCFF are equal with each other. In other words, the table MapHRFF(GtgtR, V) is a same table as the table MapSCFF(GtgtS, V) except for arguments to be applied to.

In the above expression (2), ΔGr is a value (an acceleration deviation) obtained by subtracting the actual acceleration Ga from the R target acceleration GtgtR (ΔGr=GtgtR−Ga). ΣΔGr is an integrated value of ΔGr. dΔGr/dt is a differential value of ΔGr.

K1R is a control gain (constant value) of a proportional term and differs from the control gain K1SC.

K2R is a control gain (constant value) of an integral term and differs from the control gain K2SC.

K3R is a control gain (constant value) of a differential term and differs from the control gain K3SC.

It should be noted that it will do as long as at least one equation among K1R=K1SC, K2R=K2SC, and K3R=K3SC is not satisfied.

3. 2: Preliminary R Restrain Control

After the first condition (the SC restrain control starting condition) is satisfied, even though the second condition (the SC restrain control termination condition) is not satisfied, there may be a case where the ECU 10 terminates the performance of the SC restrain control when a specific condition mentioned later becomes satisfied.

As described earlier, when a state of the accelerator pedal changes into the non-operating state while the SC restrain control is being performed (that is, when the condition B1 becomes satisfied), the SC restrain control is terminated. In other words, the accelerator pedal is in the operating state during the SC restrain control being performed. Therefore, since the third condition has been satisfied when the shift position Ps is in the R position during the SC restrain control being performed, the main R restrain control is being performed along with the SC restrain control. However, as mentioned earlier, since the SC target acceleration GtgtS is smaller than the R target acceleration GtgtR, normally, the SC target driving force SCFtgt is smaller than the main R target driving force RHFtgt. Therefore, when the driver erroneously operating the accelerator pedal (when falsely depressing the accelerator pedal deeply), the final target driving force FLFtgt has been set to the SC target driving force SCFtgt.

When the specific condition becomes satisfied and the SC restrain control terminates under such a situation, the final target driving force FLFtgt is set to the main R target driving force RHFtgt. In this case, the final target driving force FLFtgt rapidly increases from the SC target driving force SCFtgt to the main R target driving force RHFtgt. As a result, the vehicle may rapidly accelerates and the passengers may have a sense of discomfort.

Thus, under the situation mentioned above, the ECU 10 performs the preliminary R restrain control as follows in order to avoid rapid acceleration of the vehicle. Hereinafter, a timing at which the specific condition becomes satisfied, resulting in termination of the SC restrain control as well as the third condition is satisfied will be referred to as a "switching timing" for convenience sake.

The ECU 10 stores the SC target driving force SCFtgt at the switching timing (actually, a timing immediately before the switching timing) as an initial value ZFtgt0 of "gradual change target driving force ZFtgt".

When the initial value ZFtgt0 is smaller than the main R target driving force RHFtgt, the ECU 10 gradually increases the gradual change target driving force ZFtgt from the initial value ZFtgt0. The ECU 10 adopts this gradual change target driving force ZFtgt as the R target driving force RFtgt by the R restrain control during a period from the switching timing to a timing at which the gradual change target driving force ZFtgt becomes more than or equal to the main R target driving force RHFtgt. The ECU 10 adopts the main R target driving force RHFtgt as the R target driving force RFtgt by the R restrain control after a timing at which the gradual change target driving force ZFtgt has become more than or equal to the main R target driving force RHFtgt.

In contrast, in a case when the initial value ZFtgt0 is more than or equal to the main R target driving force RHFtgt, if the vehicle speed V at the switching timing is more than or equal to the second vehicle speed V2R(=V2S), the R target acceleration GtgtR and the SC target acceleration GtgtS are equal with each other, but the control gains of the PID control in the expressions (1) and (2) are switched. Therefore, in this case, if the main R target driving force RHFtgt is adopted as the final target driving force FLFtgt at the switching timing, it is highly likely that the driving force of the vehicle drastically changes.

Therefore, in the case mentioned above (that is, ZFtgt0≥RHFtgt and V≥V2R), the ECU 10 calculates preliminary R target driving force RYFtgt based on a following expression (3) until a timing at which the third condition becomes unsatisfied arrives and adopts the preliminary R target driving force RYFtgt as the R target driving force RFtgt by the R restrain control.

RYFtgt=MapHRFF(GtgtR,V)+K1SC·ΔGr+
K2SC·ΣΔGr+K3SC·dΔGr/dt    (3)

As will be understood from the expressions (1) to (3), the expression (3) is an expression where the PID control gains K1R, K2R, and K3R in the expression (2) are changed into the PID control gains K1SC, K2SC, and K3SC in the expression (1), respectively. That is, the ECU 10 calculates, maintaining the control gains of the PID control in the SC restrain control after the switching timing, driving force necessary for matching the actual acceleration Ga with the R target acceleration GtgtR as the preliminary R target driving force RYFtgt and adopts this preliminary R target driving force RYFtgt as the R target driving force RFtgt by the R restrain control. It should be noted that in this case, the integrated value ΣΔGr in the expression (3) is replaced with the integrated value ΣΔGs used in the expression (1) and the differential value dΔGr/dt in the expression (3) is replaced with the differential value dΔGs/dt used in the expression (1) at the switching timing.

(Specific Condition)

The specific condition mentioned earlier becomes satisfied when the TRC off SW 18 has changed from in the non-pressed state to in the pressed state. As described earlier, when the vehicle becomes stuck in a muddy road, a snowy road, or the like, for example, the driver sets the TRC off SW 18 to the pressed state to invalidate the traction control function as well as continues to operate the accelerator pedal, intentionally repeating the shift change, and thereby has the vehicle escape from a stuck place. Therefore, when the TRC off SW 18 has changed from in the non-pressed state to in the pressed state, it is not appropriate to continue to perform the SC restrain control. It should be noted that the ECU 10 may determine that the specific condition has become satisfied when "a switch (for example, a VSC off switch, an L4 switch, and the like mentioned later) different from the TRC off SW 18" for prohibiting the SC restrain control is operated by the driver. That is, the specific condition may be a condition which becomes satisfied when it becomes clear that the driver is in a state where the driver continues to operate the accelerator pedal while intentionally repeating the shift change.

(Specific Operation)

The CPU of the ECU 10 performs routines shown by flowcharts in FIG. 3 to FIG. 8 every time a predetermined time elapses. The CPU sets all sorts of flags and parameters which will be described later to "0" in an initialization routine performed when a non-illustrated ignition key switch of the vehicle has been changed from an off position to an on position.

Figure 3:
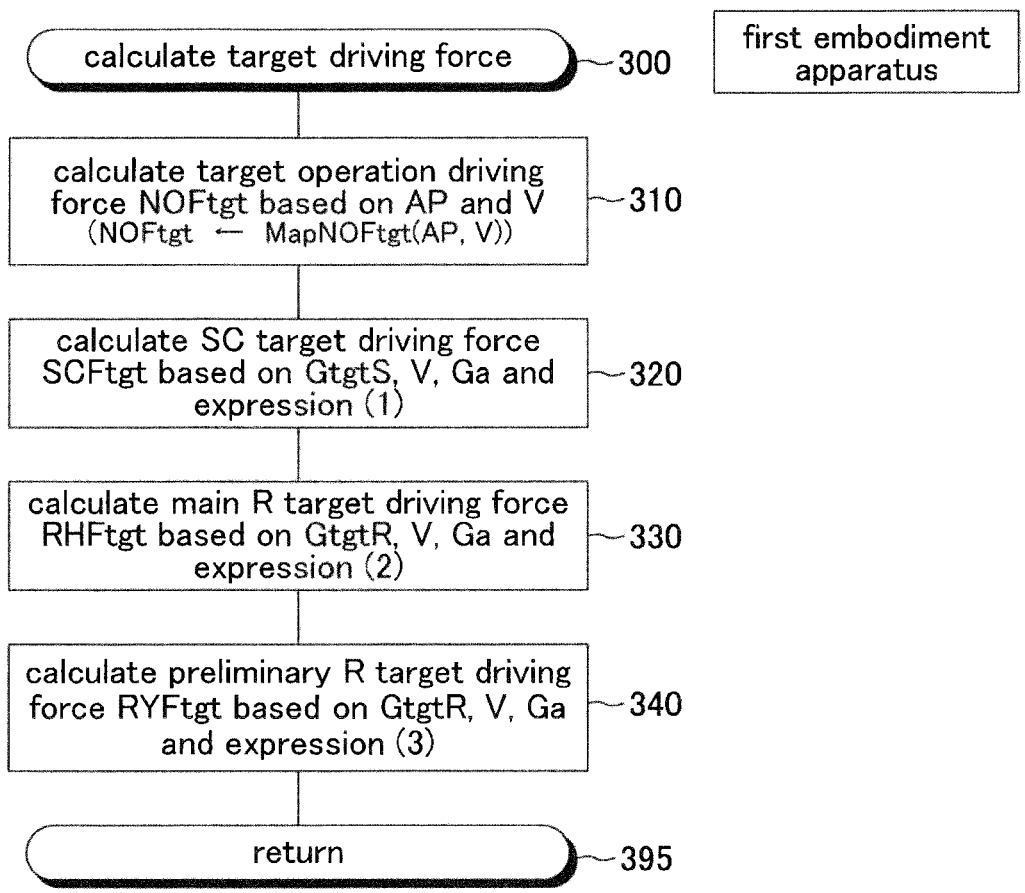
FIG. 3 is a flowchart showing a routine for calculating target driving force, the routine being executed by CPU of driving force control ECU of the first embodiment apparatus.

When a predetermined timing arrives, the CPU initiates processing from a step 300 in FIG. 3 and executes processing of a following steps 310 to 340 in order. Thereafter, the CPU proceeds to a step 395 to tentatively terminate the present routine.

Step 310: The CPU calculates the target operation driving force NOFtgt by applying the accelerator pedal operation amount AP and the vehicle speed V to the look-up table MapNOFtgt(AP, V).

Step 320: The CPU calculates the SC target driving force SCFtgt in accordance with the above mentioned expression (1).

Step 330: The CPU calculates the main R target driving force RHFtgt in accordance with the above mentioned expression (2).

Step 340: The CPU calculates the preliminary R target driving force RYFtgt in accordance with the above mentioned expression (3).

Figure 4:
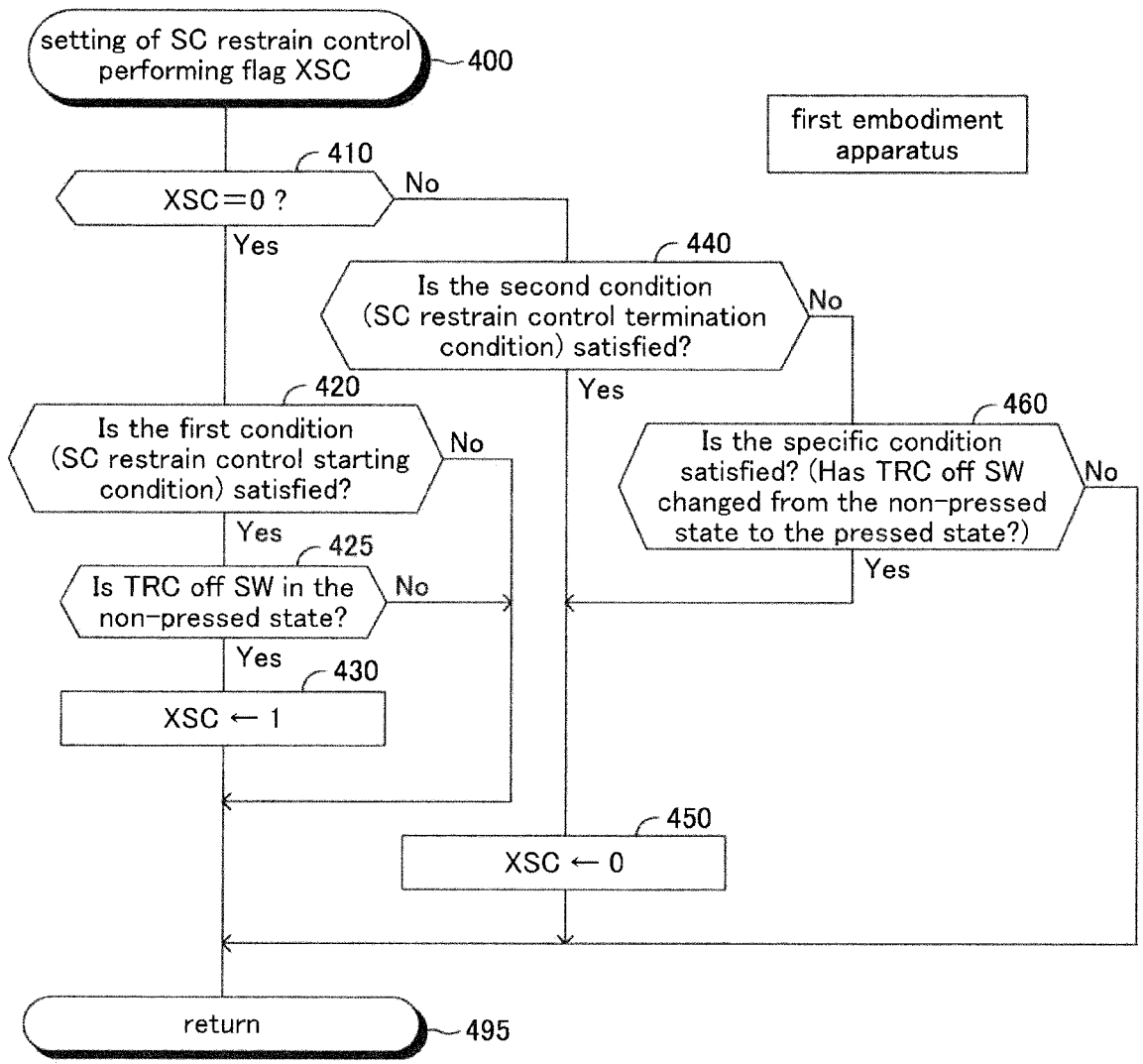
FIG. 4 is a flowchart showing a routine for setting a shift-change-timing restrain control performing flag, the routine being executed by the CPU of the first embodiment apparatus.

When a predetermined timing arrives, the CPU initiates processing from a step 400 in FIG. 4 and proceeds to a step 410 to determine whether or not a value of a SC restrain control performing flag XSC is "0". The SC restrain control performing flag XSC is a flag which shows that the SC restrain control is being performed when a value thereof is "1".

When a value of the SC restrain control performing flag XSC is "0", the CPU makes an "Yes" determination at the step 410 and proceed to a step 420 to determine whether or not the aforementioned first condition (the SC restrain control starting condition) is satisfied. When the first condition is satisfied, the CPU makes an "Yes" determination at the step 420 and proceeds to a step 425 to determine whether or not the TRC off SW 18 is in the non-pressed state (a state which is not the pressed state). For example, as will be described later in detail, when the vehicle becomes stuck in a muddy road, a snowy road, or the like, the driver sets the TRC off SW 18 to the pressed state to invalidate the traction control function as well as continues to operate the accelerator pedal, intentionally repeating the shift change, and thereby has the vehicle escape from a stuck place. Therefore, it is not appropriate to perform the SC restrain control when the TRC off SW 18 is in the pressed state.

When the TRC off SW 18 is in the non-pressed state, the CPU makes an "Yes" determination at a step 425 and proceeds to a step 430 to set a value of the SC restrain control performing flag XSC to "1". Thereafter, the CPU proceeds to a step 495 to tentatively terminate the present routine.

In contrast, when the first condition is not satisfied, the CPU makes a "No" determination at the step 420 and directly proceeds to the step 495 to tentatively terminate the present routine. Further, when the TRC off SW 18 is in the pressed state, the CPU makes a "No" determination at the step 425 and directly proceeds to the step 495 to tentatively terminate the present routine. In these cases, a value of the SC restrain control performing flag XSC is maintained as "0".

On the other hand, when a value of the SC restrain control performing flag XSC is "1", the CPU makes a "No" determination at the step 410 and proceeds to a step 440 to determine whether or not the aforementioned second condition (the SC restrain control termination condition) is satisfied. When the second condition is satisfied, the CPU makes an "Yes" determination at the step 440 and proceeds to a step 450 to set a value of the SC restrain control performing flag XSC to "0". Thereafter, the CPU proceeds to the step 495.

In contrast, when the second condition is not satisfied, the CPU makes a "No" determination at the step 440 and proceeds to a step 460 to determine whether or not the aforementioned specific condition is satisfied. That is, the CPU determines whether or not the TRC off SW 18 has changed from the non-pressed state to the pressed state. When the specific condition is satisfied, the CPU makes an "Yes" determination at the step 460 and executes the processing of the step 450 to proceed to the step 495. In contrast, when the specific condition is not satisfied, the CPU makes a "No" determination at the step 460 and directly proceeds to the step 495 to tentatively terminate the present routine.

Figure 5:
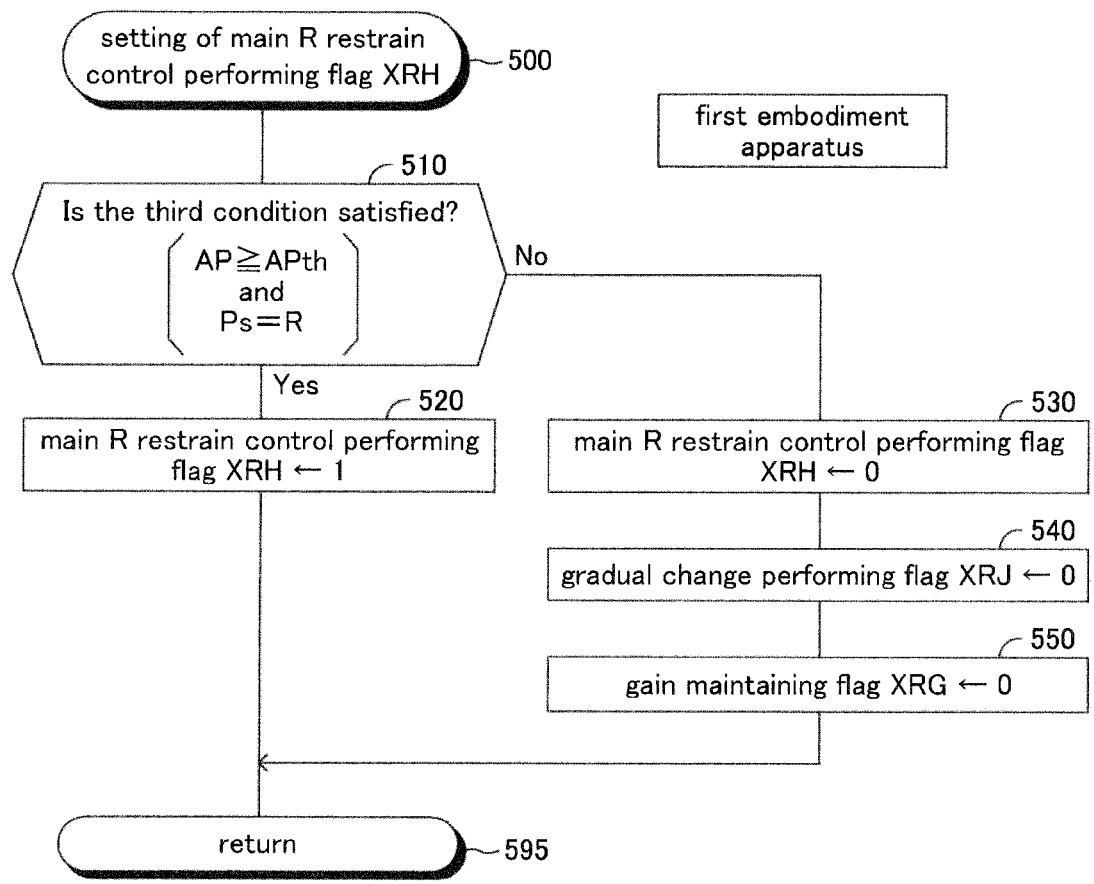
FIG. 5 is a flowchart showing a routine for setting a main R restrain control performing flag, the routine being executed by the CPU of the first embodiment apparatus.

When a predetermined timing arrives, the CPU initiates processing from a step 500 in FIG. 5 and proceeds to a step 510 to determine whether or not the aforementioned third condition (the R restrain control performing condition) is satisfied. When the third condition is satisfied, the CPU makes an "Yes" determination at the step 510 and proceeds to a step 520 to set a value of main R restrain control performing flag XRH to "1". Thereafter, the CPU proceeds to a step 595 to tentatively terminate the present routine.

In contrast, when the third condition is not satisfied, the CPU makes a "No" determination at the step 510 to execute processing of following steps 530 to 550 in order. Thereafter, the CPU proceeds to the step 595 to tentatively terminate the present routine.

Step 530: The CPU sets a value of the main R restrain control performing flag XRH to "0".

Step 540: The CPU sets a value of gradual change performing flag XRJ to "0".

Step 550: The CPU sets a value of gain maintaining flag XRG to "0".

Figure 6:
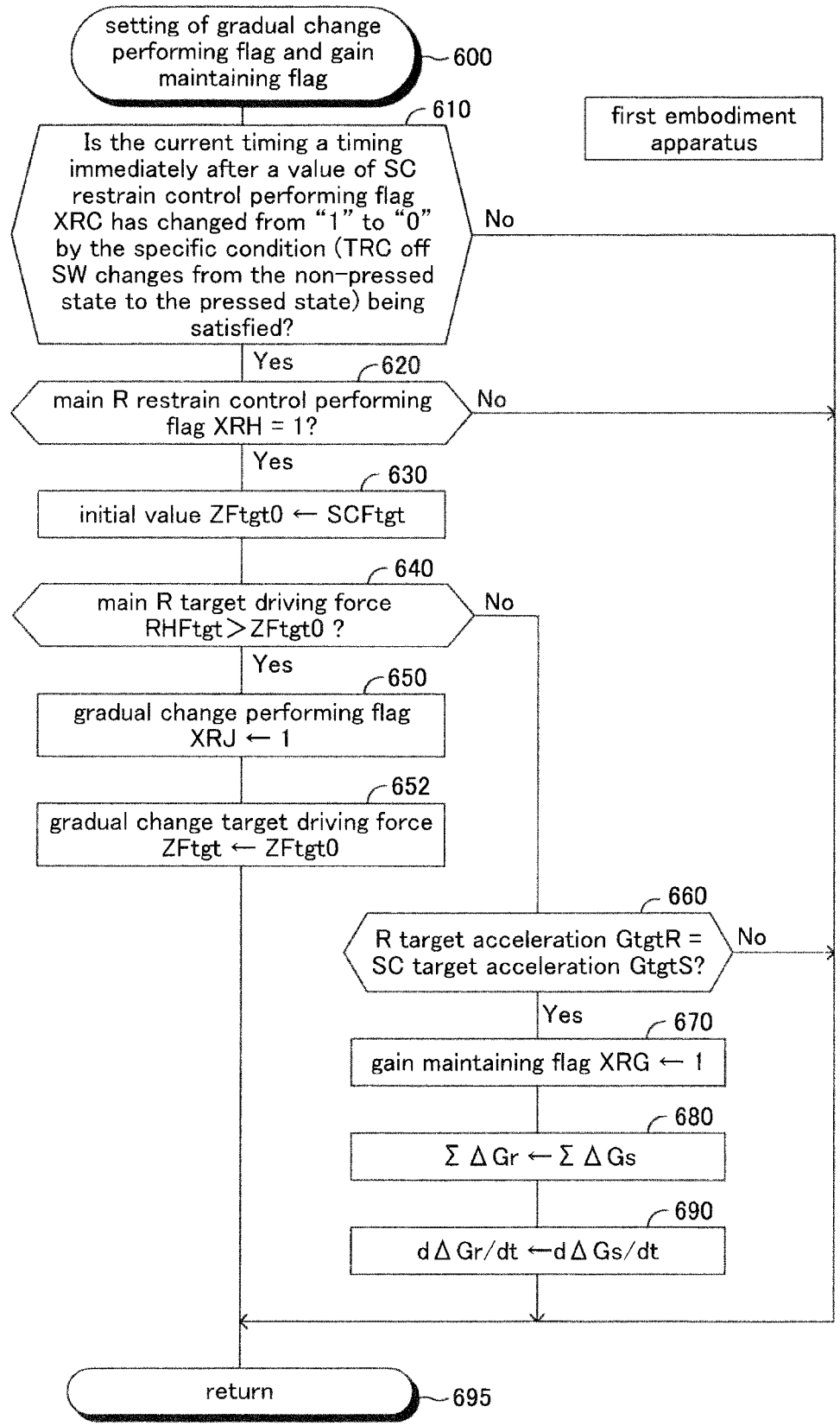
FIG. 6 is a flowchart showing a routine for setting a gradual change performing flag and a gain maintaining flag, the routine being executed by the CPU of the first embodiment apparatus.

When a predetermined timing arrives, the CPU initiates processing from a step 600 in FIG. 6 and proceeds to a step 610 to determine whether or not a current timing is a "timing immediately after a value of the SC restrain control performing flag XSC has changed from "1" to "0" by the above mentioned specific condition being satisfied". In other words, the CPU determines whether or not the current timing is a timing immediately after a timing at which an "Yes" determination was made at the step 460 in FIG. 4.

When a determination condition at the step 610 is satisfied, the CPU makes an "Yes" determination at the step 610 and proceeds to a step 620 to determine whether or not a value of the main R restrain control performing flag XRH is "1". When the value of the main R restrain control performing flag XRH is "1", the CPU makes an "Yes" determination at the step 620 and proceeds to a step 630 to obtain the SC target driving force SCFtgt calculated at the step 320 in FIG. 3 as the "initial value ZFtgt0 of the gradual change target driving force ZFtgt".

Subsequently, the CPU proceeds to a step 640 to determine whether or not the main R target driving force RHFtgt calculated at the step 330 in FIG. 3 is larger than the initial value ZFtgt0 (that is, the SC target driving force SCFtgt at a timing at which the specific condition becomes satisfied). When the main R target driving force RHFtgt is larger than the initial value ZFtgt0, the CPU makes an "Yes" determination at the step 640 and executes processing of following steps 650 and 652 in order. Thereafter, the CPU proceeds to a step 695 to tentatively terminate the present routine.

Step 650: The CPU sets a value of the gradual change performing flag XRJ to "1".

Step 652: The CPU sets the gradual change target driving force ZFtgt to the initial value ZFtgt0.

In contrast, when the main R target driving force RHFtgt is less than or equal to the initial value ZFtgt0, the CPU makes a "No" determination at the step 640 and proceeds to a step 660 to determine whether or not the R target acceleration GtgtR is equal to the SC target acceleration GtgtS. According to the examples shown in FIG. 2A and FIG. 2B, the CPU practically determines whether or not the vehicle speed V is more than or equal to the second vehicle speed V2R(=V2S) at this step 660.

When the R target acceleration GtgtR is equal to the SC target acceleration GtgtS, the CPU makes an "Yes" determination at the step 660 and executes processing of following steps 670 to 690 in order. Thereafter, the CPU proceeds to the step 695 to tentatively terminate the present routine.

Step 670: The CPU sets a value of the gain maintaining flag XRG to "1".

Step 680: The CPU sets the aforementioned integrated value $\Sigma \Delta Gr$ to the integrated value $\Sigma \Delta Gs$ used in the expression (1).

Step 690: The CPU sets the aforementioned differential value $d\Delta Gr/dt$ to the differential value $d\Delta Gs/dt$ used in the expression (1).

It should be noted that when the determination condition at the step 610 is not satisfied, the CPU makes a "No" determination at the step 610 and directly proceeds to the step 695 to tentatively terminate the present routine. Similarly, when the determination condition at the step 620 is not satisfied, the CPU makes a "No" determination at the step 620 and directly proceeds to the step 695 to tentatively terminate the present routine. Further, when the determination condition at the step 660 is not satisfied, the CPU makes a "No" determination at the step 660 and directly proceeds to the step 695 to tentatively terminate the present routine.

Figure 7:
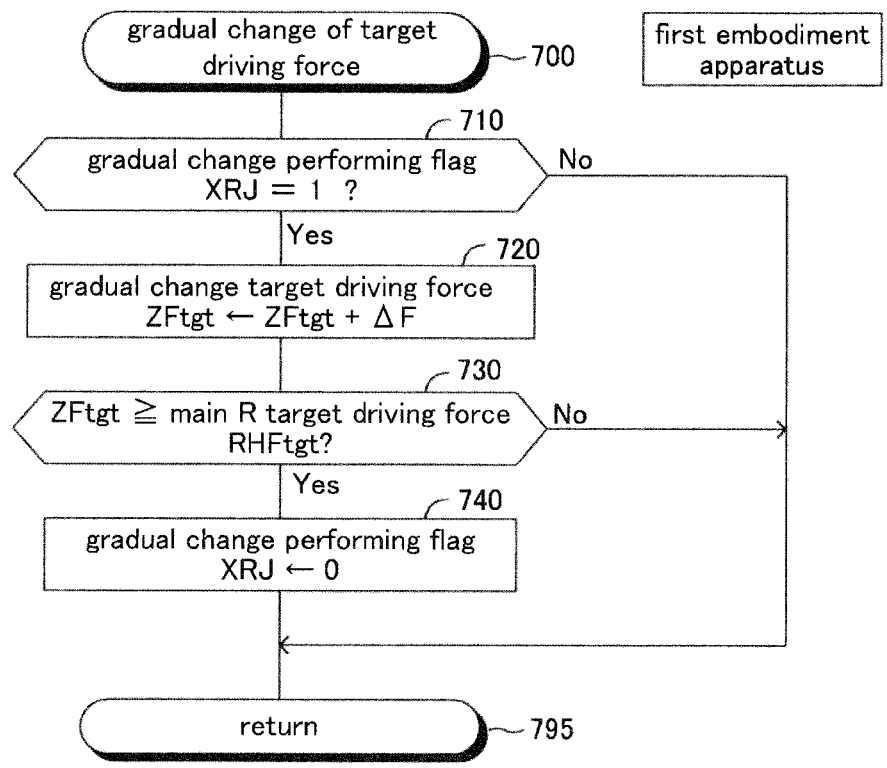
FIG. 7 is a flowchart showing a routine for gradually changing the target driving force, the routine being executed by the CPU of the first embodiment apparatus.

When a predetermined timing arrives, the CPU initiates processing from a step 700 in FIG. 7 and proceeds to a step 710 to determine whether or not a value of the gradual change performing flag XRJ is "1". When the value of the gradual change performing flag XRJ is not "1", the CPU makes a "No" determination at the step 710 and directly proceeds to a step 795 to tentatively terminate the present routine.

When the value of the gradual change performing flag XRJ is "1", the CPU makes an "Yes" determination at the step 710 and proceeds to a step 720 to add a constant positive value $\Delta F$ to the gradual change target driving force ZFtgt at that timing to increase the gradual change target driving force ZFtgt. Next, the CPU proceeds to a step 730 to determine whether or not the gradual change target driving force ZFtgt is more than or equal to the main R target driving force RHFtgt calculated at the step 330 in FIG. 3. When the gradual change target driving force ZFtgt is less than the main R target driving force RHFtgt, the CPU makes a "No" determination at the step 730 and directly proceeds to the step 795 to tentatively terminate the present routine.

When a state where a value of the gradual change performing flag XRJ is "1" continues, the processing of the step 720 is repeated and therefore the gradual change target driving force ZFtgt gradually increases. Thus, the gradual change target driving force ZFtgt becomes more than or equal to the main R target driving force RHFtgt at a certain timing. At this time, the CPU makes an "Yes" determination at the step 730 and proceeds to a step 740 to set a value of the gradual change performing flag XRJ to "0". Thereafter, the CPU proceeds to the step 795.

Figure 8:
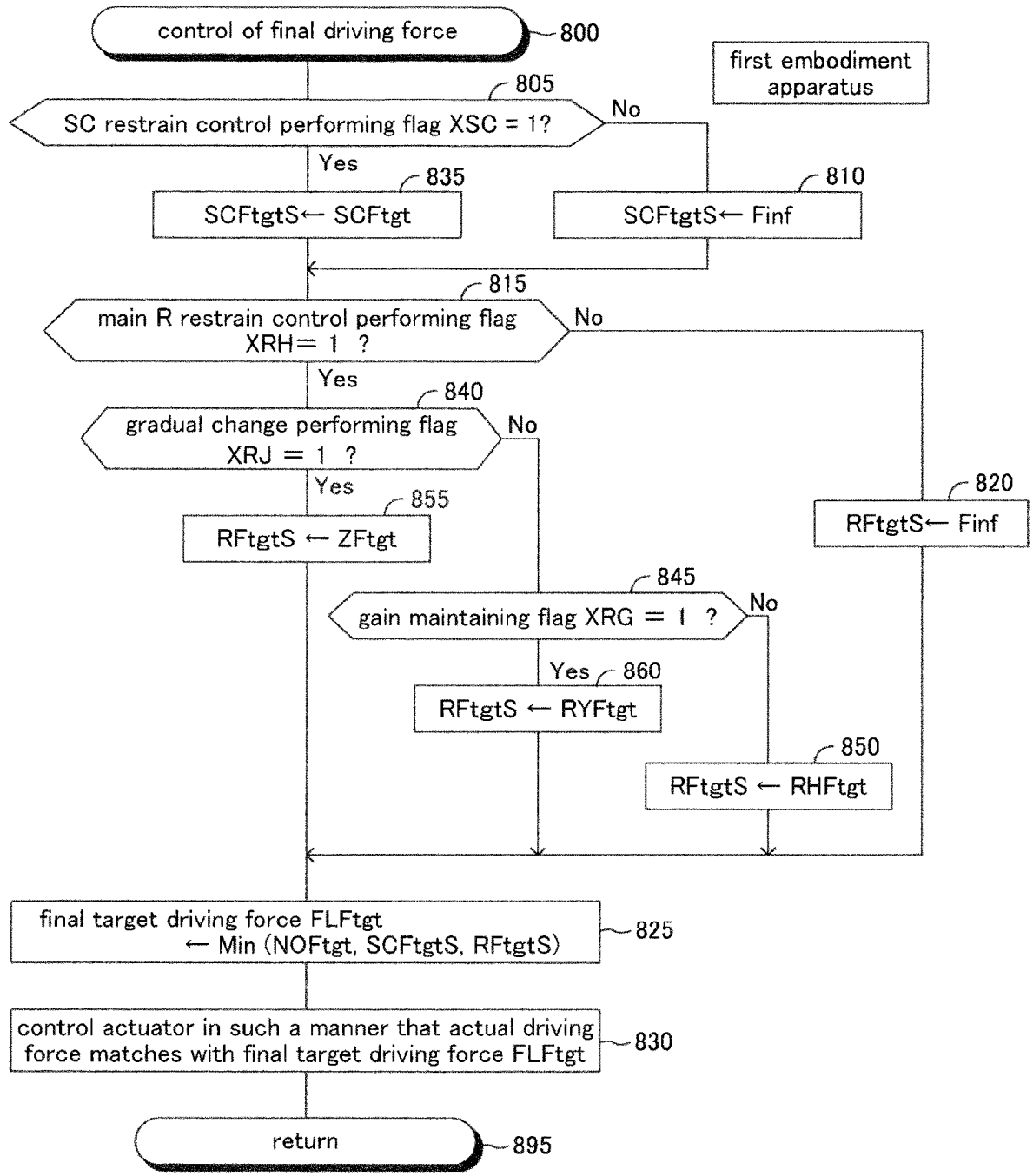
FIG. 8 is a flowchart showing a routine for controlling final driving force, the routine being executed by the CPU of the first embodiment apparatus.

When a predetermined timing arrives, the CPU initiates processing from a step 800 in FIG. 8 and proceeds to a step 805 to determine whether or not a value of the SC restrain control performing flag XSC is "1". When the value of the SC restrain control performing flag XSC is "0", the CPU makes a "No" determination at a step 805 and proceeds to a step 810 to set a value of a selection-use SC target driving force SCFtgtS to a large value which is normally improbable (hereinafter, will be referred to as an "infinite value Finf").

Next, the CPU proceeds to a step 815 to determine whether or not a value of the main R restrain control performing flag XRH is "1". When the value of the main R restrain control performing flag XRH is "0", the CPU makes a "No" determination at the step 815 and proceeds to a step 820 to set a value of a selection-use R target driving force RFtgtS to an infinite value Finf. Thereafter, the CPU executes processing of following steps 825 to 830 in order and proceeds to a step 895 to tentatively terminate the present routine.

Step 825: The CPU selects smallest driving force among the target operation driving force NOFtgt calculated at the step 310 in FIG. 3, the selection-use SC target driving force SCFtgtS, and the selection-use R target driving force RFtgtS, and adopts the selected driving force as the final target driving force FLFtgt. It should be noted that as shown in FIG. 3, the SC target driving force SCFtgt, the main R target driving force RHFtgt, and the preliminary R target driving force RYFtgt are each calculated every time the predetermined calculation interval elapses. Therefore, strictly, when the target operation driving force NOFtgt has been selected, the CPU resets $\Sigma \Delta Gs$ and $d\Delta Gs/dt$ of the selection-use SC target driving force SCFtgtS (strictly, SCFtgt) and $\Sigma \Delta Gr$ ($\Sigma \Delta Gs$) and $d\Delta Gr/dt$ ($d\Delta Gs/dt$) of the selection-use R target driving force RFtgtS (strictly, RHFtgt and RYFtgt), respectively. In addition, when the selection-use SC target driving force SCFtgtS has been selected, the CPU resets $\Sigma \Delta Gr$ ($\Sigma \Delta Gs$) and $d\Delta Gr/dt$ ($d\Delta Gs/dt$) of the selection-use R target driving force RFtgtS (strictly, RHFtgt and RYFtgt). Further, when the selection-use R target driving force RFtgtS has been selected, the CPU resets $\Sigma \Delta Gs$ and $d\Delta Gs/dt$ of the selection-use SC target driving force SCFtgtS (strictly, SCFtgt).

Step 830: The CPU controls the actuator 21 in such a manner that the actual driving force matches with the final target driving force FLFtgt.

As described above, since a value of the selection-use SC target driving force SCFtgtS is set to the infinite value Finf when a value of the SC restrain control performing flag XSC is "0", it will not happen that the selection-use SC target driving force SCFtgtS is selected as the final target driving force FLFtgt at the step 825. In other words, when a value of the SC restrain control performing flag XSC is "0", it will not happen that the target operation driving force NOFtgt is limited by the selection-use SC target driving force SCFtgtS.

Similarly, since a value of the selection-use R target driving force RFtgtS is set to the infinite value Finf when a value of the main R restrain control performing flag XRH is "0", it will not happen that the selection-use R target driving force RFtgtS is selected as the final target driving force FLFtgt at the step 825.

On the other hand, when a value of the SC restrain control performing flag XSC is "1", the CPU makes an "Yes" determination at the step 805 and proceeds to a step 835 to set the selection-use SC target driving force SCFtgtS to the SC target driving force SCFtgt calculated at the step 320 in FIG. 3. Thereafter, the CPU proceeds to the step 815.

Further, when a value of the main R restrain control performing flag XRH is "1", the CPU makes an "Yes" determination at the step 815 and proceeds to a step 840 to determine whether or not a value of the gradual change performing flag XRJ is "1". When the value of the gradual change performing flag XRJ is "0", the CPU makes a "No" determination at the step 840 and proceeds to a step 845 to determine whether or not a value of the gain maintaining flag XRG is "1". When the value of the gain maintaining flag XRG is "0", the CPU makes a "No" determination at the step 845 and proceeds to a step 850 to set the selection-use R target driving force RFtgtS to the main R target driving force RHFtgt calculated at the step 330 in FIG. 3. Thereafter, the CPU executes the processing of the step 825 and the step 830.

In addition, when the value of the gradual change performing flag XRJ is "1" at a timing of executing the processing of the step 840, the CPU makes an "Yes" determination at the step 840 and proceeds to a step 855 to set the selection-use R target driving force RFtgtS to the gradual change target driving force ZFtgt calculated at the step 720 in FIG. 7. Thereafter, the CPU executes the processing of the step 825 and the step 830.

In addition, when the value of the gain maintaining flag XRG is "1" at a timing of executing the processing of the step 845, the CPU makes an "Yes" determination at the step 845 and proceeds to a step 860 to set the selection-use R target driving force RFtgtS to the preliminary R target driving force RYFtgt calculated at the step 340 in FIG. 3. Thereafter, the CPU executes the processing of the step 825 and the step 830.

As described above, according to the first embodiment apparatus, when the specific condition becomes satisfied during the SC restrain control being performed, the SC restrain control is terminated at that timing. In this case, if the shift position is in the D position, any driving force restrain control will not be performed, and thus the target operation driving force NOFtgt is adopted as the final target driving force FLFtgt. As a result, it becomes possible for the driver to drive (move) the vehicle forward with driving force which well corresponds to the accelerator pedal operation by the driver him/herself and thus was expected by the driver. That is, a possibility that the travelling performance of the vehicle is degraded can be reduced.

On the other hand, if the shift position is in the R position at a timing when the specific condition becomes satisfied during the SC restrain control being performed, the SC restrain control is terminated at that timing (the switching timing) and is switched to the R restrain control. In this case, if a relationship of "main R target driving force RHFtgt>SC target driving force SCFtgt (that is, the initial value ZFtgt0 of the gradual change target driving force ZFtgt)" is satisfied at the switching timing as well as the R target driving force RFtgt not the target operation driving force NOFtgt is adopted as the final target driving force FLFtgt, the driving force increases. Therefore, comparing to a case where the specific condition is not satisfied (the TRC off SW 18 is in the non-pressed state) during the SC restrain control being performed, a possibility that the travelling performance of the vehicle is degraded can be reduced. In addition, since the driving force is limited due to the R restrain control, safety at the reverse timing can be ensured as well.

Meanwhile, in a case where a relationship of "main R target driving force RHFtgt≤SC target driving force SCFtgt (=ZFtgt0)" is satisfied at the switching timing as well as the R target driving force RFtgt not the target operation driving force NOFtgt is adopted as the final target driving force FLFtgt, the driving force is limited due to the R restrain control and therefore safety at the reverse timing can be ensured.

In addition, according to the first embodiment apparatus, in a case when the specific condition has been already satisfied at a timing when the first condition (the SC restrain control starting condition) becomes satisfied (that is, in a case when the TRC off SW 18 is in the pressed state at a timing when the first condition becomes satisfied), the SC restrain control will not be started. In this case, if the shift position is in the D position, any driving force restrain control will not be performed and thus the target operation driving force NOFtgt is adopted as the final target driving force FLFtgt. As a result, it becomes possible for the driver to drive (move) the vehicle forward with driving force which well corresponds to the accelerator pedal operation by the driver him/herself and thus was expected by the driver. That is, a possibility that the travelling performance of the vehicle is degraded can be reduced.

On the other hand, when the shift position is in the R position at a timing when the first condition becomes satisfied, the main R restrain control is performed since the third condition is satisfied. Therefore, safety at the reverse timing can be ensured.

Further, according to the first embodiment apparatus, in either cases of a case where the specific condition becomes satisfied during the R restrain control (strictly, the main R restrain control) being performed and a case where the specific condition has been already satisfied at a timing when the third condition (the R restrain control performing condition) becomes satisfied, the R restrain control (strictly, the main R restrain control) is performed. Therefore, safety at the reverse timing can be ensured.

As mentioned above, according to the first embodiment apparatus, a possibility that the travelling performance of the vehicle is degraded can be reduced as well as safety at the reverse timing can be ensured.

Especially, according to the first embodiment apparatus, when the relationship of "main R target driving force RHFtgt>SC target driving force SCFtgt (=initial value ZFtgt0)" is satisfied at the switching timing, this gradual change target driving force ZFtgt is adopted as the R target driving force RFtgt by the R restrain control during a period from the switching timing to a timing at which the gradual change target driving force ZFtgt becomes more than or equal to the main R target driving force RHFtgt (that is, the reaching timing). Therefore, when the R target driving force RFtgt is adopted as the final target driving force FLFtgt during the period from the switching timing to the reaching timing, a possibility that the final target driving force FLFtgt rapidly increases from the SC target driving force SCFtgt to the main R target driving force RHFtgt can be significantly reduced. In other words, the final target driving force FLFtgt increases in a smooth manner during the period from the switching timing to the reaching timing. As a result, a possibility that the vehicle rapidly accelerates at the switching timing can be largely reduced.

In addition, according to the first embodiment apparatus, in a case when the relationship of "main R target driving force RHFtgt≤SC target driving force SCFtgt (=initial value ZFtgt0)" is satisfied at the switching timing as well as a relationship of "R target acceleration GtgtR=SC target acceleration GtgtS" is satisfied, the preliminary R target driving force RYFtgt is adopted after the switching timing as the R target driving force RFtgt by the R restrain control. The preliminary R target driving force RYFtgt is calculated using the control gains K1SC, K2SC, and K3SC of the PID control in the SC restrain control. Therefore, when the R target driving force RFtgt is adopted after the switching timing as the final target driving force FLFtgt, a possibility that the driving force largely fluctuates due to the switching of the control gains can be significantly reduced.

Second Embodiment

A driving force control apparatus according to a second embodiment of the present invention (hereinafter, also referred to as a "second embodiment apparatus") differs from the first embodiment apparatus in that the second embodiment apparatus does not perform the preliminary R restrain control. A description will be made below, focusing on this difference.

Figure 9:
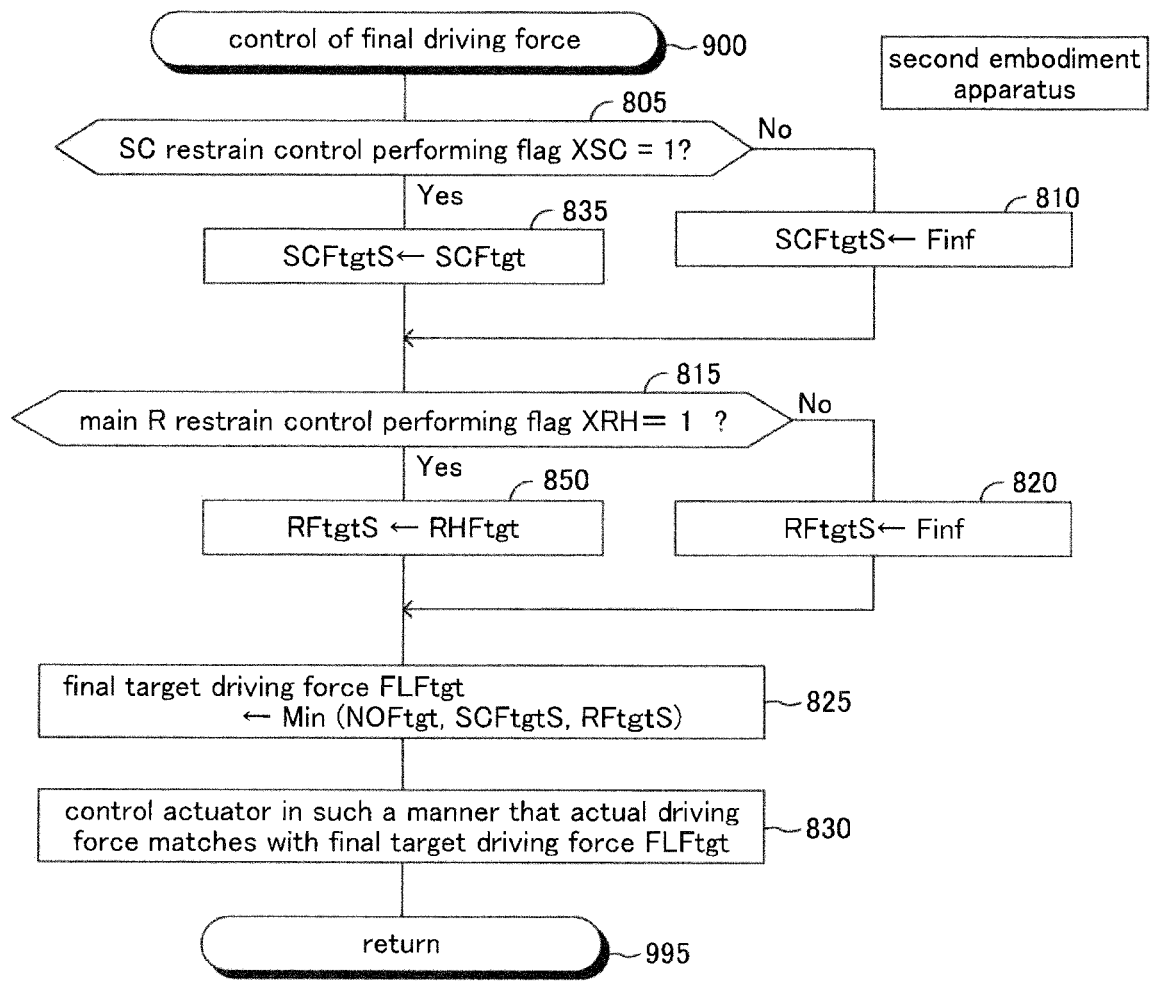
FIG. 9 is a flowchart showing a routine for controlling final driving force, the routine being executed by CPU of driving force control ECU of a driving force control apparatus according to a second embodiment of the present invention.

CPU of the ECU 10 of the second embodiment apparatus executes following routines.
   a routine where the step 340 is omitted among the routine shown in FIG. 3
   the routine shown in FIG. 4
   a routine where the steps 540 and 550 are omitted among the routine shown in FIG. 5
   a routine shown in FIG. 9 in place of FIG. 8

Since the operation of the CPU based on the routines shown in FIG. 3, FIG. 4, and FIG. 5 has been already described, operation of the CPU based on the routine shown in FIG. 9 will be described below. It should be noted that references assigned to steps shown in FIG. 9 matches with the references assigned to the steps for which the description has been already made.

When a predetermined timing arrives, the CPU initiates processing from a step 900 in FIG. 9. When the value of the SC restrain control performing flag XSC is "0", the CPU makes a "No" determination at the step 805 and proceeds to the step 810 to set a value of the selection-use SC target driving force SCFtgtS to the infinite value Finf. Thereafter, the CPU proceeds to the step 815.

When the value of the SC restrain control performing flag XSC is "1", the CPU makes an "Yes" determination at the step 805 and proceeds to the step 835 to set the selection-use SC target driving force SCFtgtS to the SC target driving force SCFtgt calculated at the step 320 in FIG. 3. Thereafter, the CPU proceeds to the step 815.

Further, when the value of the main R restrain control performing flag XRH is "0", the CPU makes a "No" determination at the step 815 and proceeds to the step 820 to set a value of the selection-use R target driving force RFtgtS to the infinite value Finf. Thereafter, the CPU executes the processing of the step 825 and the step 830 in order and proceeds to the step 895 to tentatively terminate the present routine.

When the value of the main R restrain control performing flag XRH is "1", the CPU makes an "Yes" determination at the step 815 and proceeds to the step 850 to set the selection-use R target driving force RFtgtS to the main R target driving force RHFtgt calculated at the step 330 in FIG. 3. Thereafter, the CPU executes the processing of the step 825 and the step 830.

As described above, according to the second embodiment apparatus, the preliminary R restrain control is not performed. This configuration also makes it possible to reduce a possibility that the travelling performance of the vehicle is degraded as well as to ensure safety at the reverse timing.

Third Embodiment

A driving force control apparatus according to a third embodiment of the present invention (hereinafter, also referred to as a "third embodiment apparatus") differs from the first embodiment apparatus mainly in following points.
   a point that the third embodiment apparatus performs moderate SC restrain control
   a point that the third embodiment apparatus does not perform the preliminary R restrain control A description will be made below, focusing on these differences.

When the above mentioned first condition becomes satisfied, ECU 10 of the third embodiment apparatus initiates either one of the SC restrain control or the moderate SC restrain control. When the above mentioned second condition becomes satisfied, the ECU 10 terminates the SC restrain control or the moderate SC restrain control which is being performed. That is, in the present embodiment, the first condition is a moderate SC restrain control starting condition as well, and the second condition is a moderate SC restrain control termination condition as well.

In a case when the first condition becomes satisfied, if the TRC off SW 18 is in the non-pressed state, the ECU 10 performs the aforementioned SC restrain control. That is, the ECU 10 calculates the SC target driving force SCFtgt in accordance with the above expression (1).

In contrast, in a case when the first condition becomes satisfied, if the TRC off SW 18 is in the pressed state, the ECU 10 performs the moderate SC restrain control. That is, the ECU 10 calculates moderate SC target driving force SCLFtgt as follows.

(Calculation of Moderate SC Target Driving Force SCLFtgt)

The ECU 10 calculates moderate shift-change-timing target acceleration (moderate SC target acceleration, moderate SC upper limit acceleration) GtgtSL by applying the vehicle speed V to a moderate shift-change-timing target acceleration look-up table MapSL(V) regulating a relationship between the vehicle speed V and the moderate SC target acceleration GtgtSL.

Figure 10A:
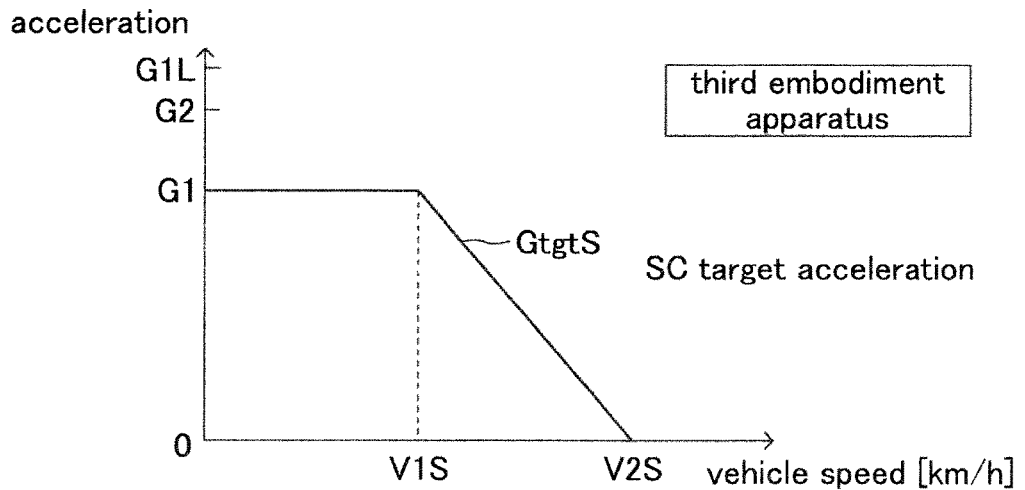
FIG. 10A is a diagram showing a shift-change-timing target acceleration look-up table regulating a relationship between vehicle speed and shift-change-timing target acceleration, the look-up table being stored in a driving force control apparatus according to a third embodiment of the present invention (hereinafter, referred to as a "third embodiment apparatus").
Figure 10B:
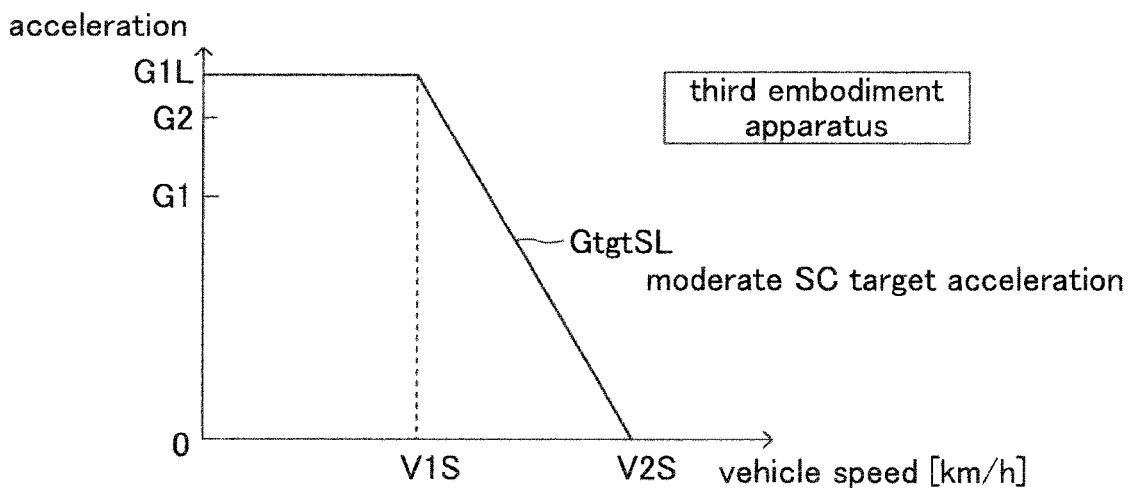
FIG. 10B is a diagram showing a moderate shift-change-timing target acceleration look-up table regulating a relationship between the vehicle speed and moderate shift-change-timing target acceleration.
Figure 10C:
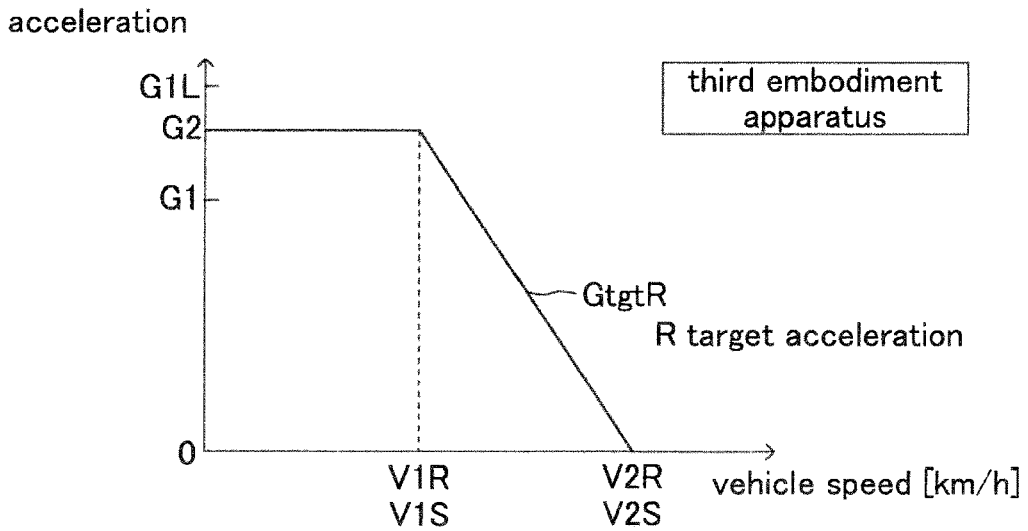
FIG. 10C is a diagram showing a reverse-timing target acceleration look-up table regulating a relationship between the vehicle speed and reverse-timing target acceleration.

FIG. 10A shows a shift-change-timing target acceleration table MapS(V) same as the table in FIG. 2A, and FIG. 10B shows the table MapSL(V). Further, FIG. 10C shows a reverse-timing target acceleration look-up table MapR(V) same as the table in FIG. 2B.

According to the table MapSL(V), when the vehicle speed V is in a range between more than or equal to zero and less than the first vehicle speed V1S, the moderate SC target acceleration GtgtSL is set to a predetermined moderate acceleration G1L. Further, when the vehicle speed V is in a range between more than or equal to the first vehicle speed V1S and less than the second vehicle speed V2S, the moderate SC target acceleration GtgtSL linearly decreases from the moderate acceleration G1L to zero as the vehicle speed V increases. When the vehicle speed V is in a range more than or equal to the second vehicle speed V2S, the moderate SC target acceleration GtgtSL is set to zero.

In the present embodiment, the moderate acceleration G1L is larger than the second acceleration G2. Therefore, when the vehicle speed is in a range less than the second vehicle speed V2S(=V2R), a following relationship is always satisfied.

SC target acceleration GtgtS<R target acceleration GtgtR< moderate SC target acceleration GtgtSL The ECU 10 calculates, based on the aforementioned actual acceleration Ga, the moderate SC target acceleration GtgtSL and the like, driving force necessary for matching the actual acceleration Ga with the moderate SC target acceleration GtgtSL as moderate target driving force at the shift-change-timing (hereinafter, will be referred to as "moderate SC target driving force") SCLFtgt. It should be noted that in the present embodiment, when the moderate SC restrain control is not being performed, the ECU 10 sets the moderate SC target driving force SCLFtgt to a "significantly large value which is normally improbable".

More specifically, the ECU 10 calculates the moderate SC target driving force SCLFtgt based on the PID control in accordance with a following expression (4). In the expression (4), $\Delta GsL$ is a value (an acceleration deviation) obtained by subtracting the actual acceleration Ga from the moderate SC target acceleration GtgtSL ($\Delta GsL = GtgtSL - Ga$). $\Sigma \Delta GsL$ is an integrated value of $\Delta GsL$. $d\Delta GsL/dt$ is a differential value of $\Delta GsL$.

$$SCLFtgt = MapSCFF(GtgtSL, V) + K1SC \cdot \Delta GsL + K2SC \cdot \Sigma \Delta GsL + K3SC \cdot d\Delta GsL/dt \quad (4)$$

During the moderate SC restrain control being performed, the ECU 10 selects smallest driving force among the target operation driving force NOFtgt, the moderate SC target driving force SCLFtgt, and the reverse-timing target driving force RFtgt as final target driving force FLFtgt and controls the actuator 21 in such a manner that actual driving force matches with the final target driving force FLFtgt.

(Specific Operation)

Figure 11:
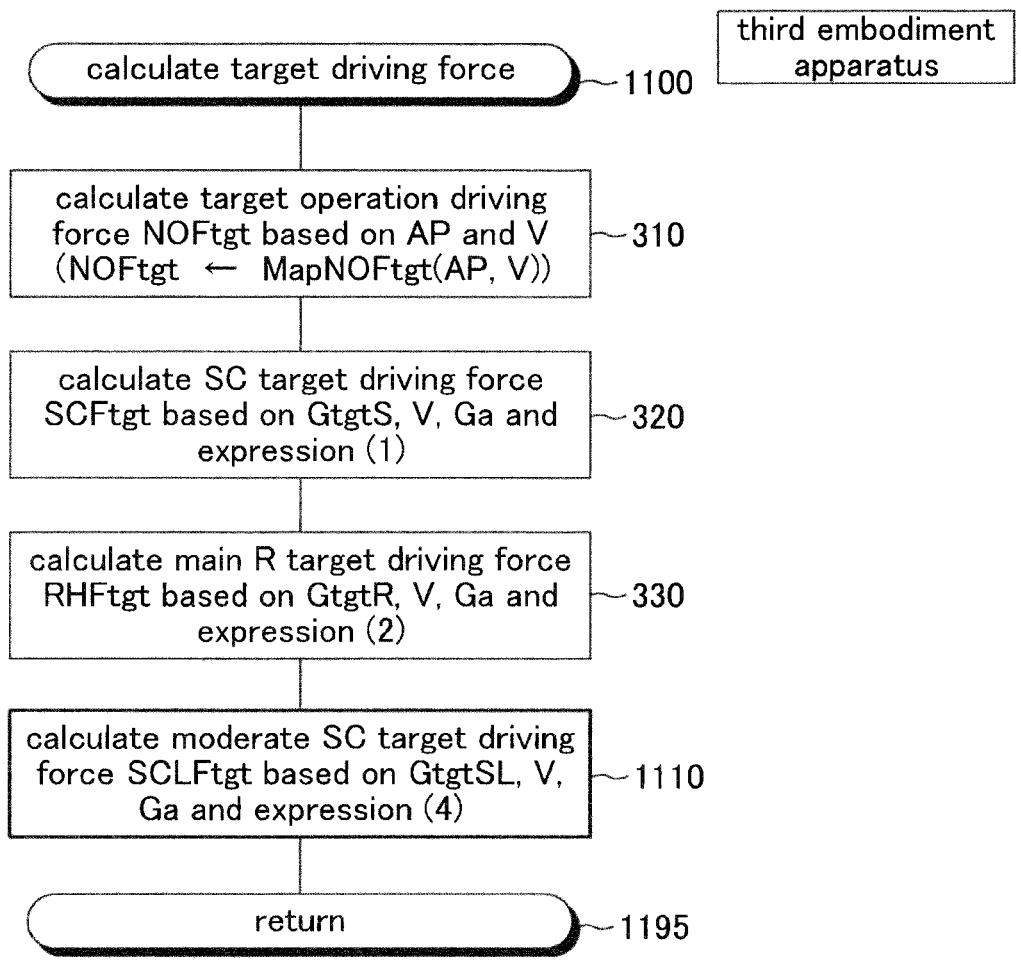
FIG. 11 is a flowchart showing a routine for calculating target driving force, the routine being executed by CPU of driving force control ECU of the third embodiment apparatus.
Figure 12:
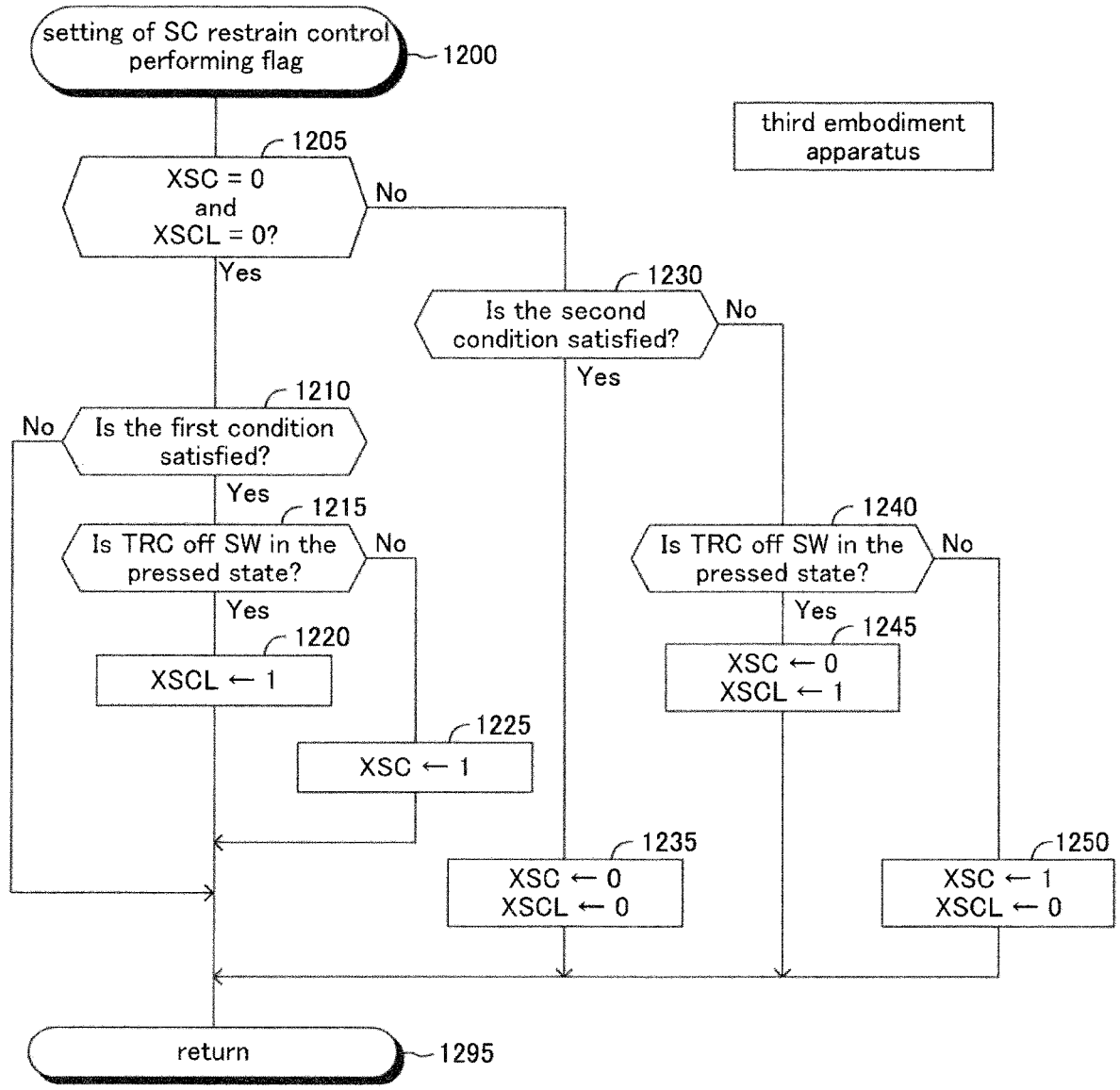
FIG. 12 is a flowchart showing a routine for setting a shift-change-timing restrain control performing flag, the routine being executed by the CPU of the third embodiment apparatus.
Figure 13:
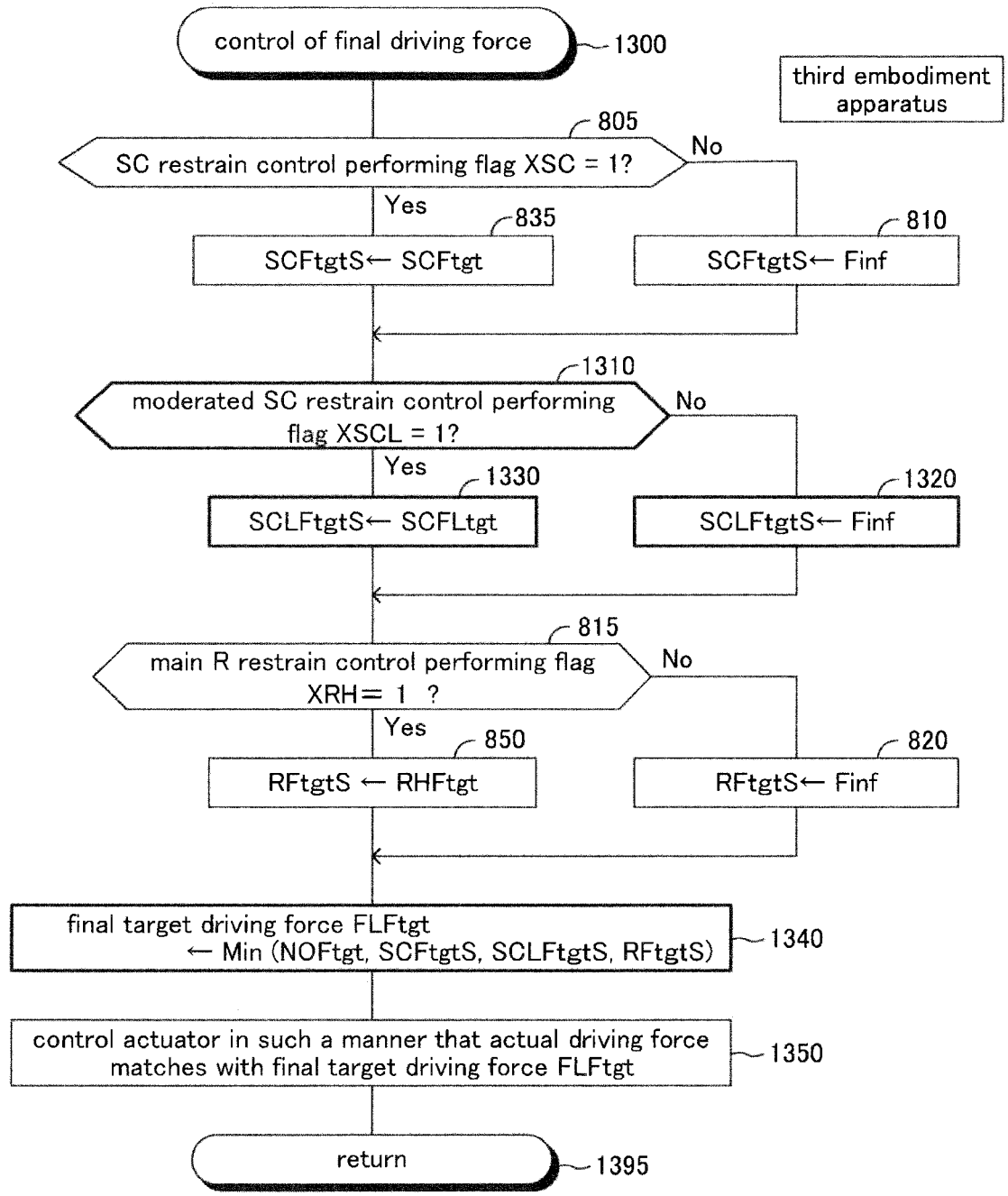
FIG. 13 is a flowchart showing a routine for controlling final driving force, the routine being executed by the CPU of the third embodiment apparatus.

CPU of the ECU 10 of the third embodiment apparatus executes following routines.

a routine shown in FIG. 11 in place of FIG. 3
a routine shown in FIG. 12 in place of FIG. 4
a routine where the steps 540 and 550 are omitted among the routine shown in FIG. 5
a routine shown in FIG. 13 in place of FIG. 8

It should be noted that in these figures, references assigned to the previously mentioned steps have been assigned to steps where the same processing as the previously mentioned steps is executed. Descriptions for these steps will be suitably omitted. Since the operation of the CPU based on the routine shown in FIG. 5 has been already described, operation of the CPU based on routines shown in FIG. 11, FIG. 12, and FIG. 13 will be described below.

When a predetermined timing arrives, the CPU initiates processing from a step 1100 in FIG. 11 and executes the processing of the step 310 to the step 330. Subsequently, the CPU proceeds to a step 1110 to calculate the moderate SC target driving force SCLFtgt in accordance with the above mentioned expression (4). Thereafter, the CPU proceeds to a step 1195 to tentatively terminate the present routine.

When a predetermined timing arrives, the CPU initiates processing from a step 1200 in FIG. 12 and proceeds to a step 1205 to determine whether or not values of "the SC restrain control performing flag XSC and a moderate SC restrain control performing flag XSCL" are both "0".

When the values of "the SC restrain control performing flag XSC and a moderate SC restrain control performing flag XSCL" are both "0", the CPU makes an "Yes" determination at the step 1205 and proceeds to a step 1210 to determine whether or not the aforementioned first condition is satisfied. When the first condition is not satisfied, the CPU makes a "No" determination at the step 1210 and directly proceeds to a step 1295 to tentatively terminate the present routine.

In contrast, when the first condition is satisfied, the CPU makes an "Yes" determination at the step 1210 and proceeds to a step 1215 to determine whether or not the TRC off SW 18 is in the pressed state.

When the TRC off SW 18 is in the pressed state, the CPU makes an "Yes" determination at the step 1215 and proceeds to a step 1220 to set a value of the moderate SC restrain control performing flag XSCL to "1". Thereafter, the CPU proceeds to the step 1295 to tentatively terminate the present routine. In contrast, when the TRC off SW 18 is not in the pressed state, the CPU makes a "No" determination at the step 1215 and proceeds to a step 1225 to set a value of the SC restrain control performing flag XSC to "1". The CPU thereafter proceeds to the step 1295 to tentatively terminate the present routine.

On the other hand, when at least one of the values of the SC restrain control performing flag XSC and the moderate SC restrain control performing flag XSCL is not "0", the CPU makes a "No" determination at the step 1205 and proceeds to a step 1230 to determine whether or not the above mentioned second condition is satisfied. When the second condition is satisfied, the CPU makes an "Yes" determination at the step 1230 and proceeds to a step 1235 to set each of a value of the SC restrain control performing flag XSC and a value of the moderate SC restrain control performing flag XSCL to "0". The CPU thereafter proceeds to the step 1295.

When the second condition is not satisfied at a timing when the CPU executes the processing of the step 1230, the CPU makes a "No" determination at the step 1230 and proceeds to a step 1240 to determine whether or not the TRC off SW 18 is in the pressed state.

When the TRC off SW 18 is in the pressed state, the CPU makes an "Yes" determination at the step 1240 and proceeds to a step 1245 to set a value of the SC restrain control performing flag XSC to "0" as well as set a value of the moderate SC restrain control performing flag XSCL to "1". The CPU thereafter proceeds to the step 1295.

In contrast, when the TRC off SW 18 is not in the pressed state, the CPU makes a "No" determination at the step 1240 and proceeds to a step 1250 to set a value of the SC restrain control performing flag XSC to "1" as well as set a value of the moderate SC restrain control performing flag XSCL to "0". The CPU thereafter proceeds to the step 1295.

When a predetermined timing arrives, the CPU initiates processing from a step 1300 in FIG. 13. When a value of the SC restrain control performing flag XSC is "0", the CPU makes a "No" determination at the step 805 and proceeds to the step 810 to set a value of the selection-use SC target driving force SCFtgtS to the infinite value Finf. Thereafter, the CPU proceeds to a step 1310.

When a value of the SC restrain control performing flag XSC is "1", the CPU makes an "Yes" determination at the step 805 and proceeds to the step 835 to set the selection-use SC target driving force SCFtgtS to the SC target driving force SCFtgt calculated at the step 320 in FIG. 11. Thereafter, the CPU proceeds to the step 1310.

The CPU determines, at the step 1310, whether or not a value of the moderate SC restrain control performing flag XSCL is "1". When the value of the moderate SC restrain control performing flag XSCL is "0", the CPU makes a "No" determination at the step 1310 and proceeds to a step 1320 to set a value of selection-use moderate SC target driving force SCLFtgtS to the infinite value Finf. The CPU thereafter proceeds to the step 815.

When the value of the moderate SC restrain control performing flag XSCL is "1", the CPU makes an "Yes" determination at the step 1310 and proceeds to a step 1330 to set the selection-use SC moderate target driving force SCLFtgtS to the moderate SC target driving force SCLFtgt calculated at the step 1110 in FIG. 11. The CPU thereafter proceeds to the step 815.

When the value of the main R restrain control performing flag XRH is "0", the CPU makes a "No" determination at the step 815 and proceeds to the step 820 to set a value of the selection-use R target driving force RFtgtS to the infinite value Finf. Thereafter, the CPU executes processing of a step 1340 and a step 1350 described below in order and proceeds to a step 1395 to tentatively terminate the present routine.

Step 1340: The CPU selects smallest driving force among the target operation driving force NOFtgt calculated at the step 310 in FIG. 11, the selection-use SC target driving force SCFtgtS, the selection-use moderate SC target driving force SCLFtgtS, and the selection-use R target driving force RFtgtS, and adopts the selected driving force as the final target driving force FLFtgt.

Step 1350: The CPU controls the actuator 21 in such a manner that the actual driving force matches with the final target driving force FLFtgt.

As described above, according to the third embodiment apparatus, when the specific condition becomes satisfied during the SC restrain control being performed, the SC restrain control is terminated at that timing. In this case, if the second condition (the moderate SC restrain control termination condition) has not been satisfied, the moderate SC restrain control is started regardless of the shift position being in the D position or in the R position. That is, a type of the restrain control is switched from the SC restrain control to the moderate SC restrain control. Therefore, in a case when the moderate SC target driving force SCLFtgt not the target operation driving force NOFtgt is adopted as the final target driving force FLFtgt, the driving force increases both in a forward direction and in a reverse (backward) direction. Thus, comparing to a case where the specific condition is not satisfied (the TRC off SW 18 is in the non-pressed state) during the SC restrain control being performed, a possibility that the travelling performance of the vehicle is degraded can be reduced. In addition, since the driving force is limited by the moderate SC restrain control, safety at the reverse timing can be ensured as well.

Besides, according to the third embodiment apparatus, in a case when the specific condition has been already satisfied at a timing when the first condition (the SC restrain control starting condition, the moderate SC restrain control starting condition) becomes satisfied (that is, in a case when the TRC off SW 18 is in the pressed state at a timing when the first condition becomes satisfied), the moderate SC restrain control not the SC restrain control is started regardless of the shift position being in the D position or in the R position. Therefore, when the moderate SC target driving force SCLFtgt not the target operation driving force NOFtgt is adopted as the final target driving force FLFtgt, the driving force increases both in the forward direction and in the reverse (backward) direction. Thus, comparing to a case where the specific condition is not satisfied (the TRC off SW 18 is in the non-pressed state) at a timing when the first condition becomes satisfied, a possibility that the travelling performance of the vehicle is degraded can be reduced. In addition, since the driving force is limited by the moderate SC restrain control, safety at the reverse timing can be ensured as well.

Further, according to the third embodiment apparatus, in either cases of a case where the specific condition becomes satisfied during the main R restrain control being performed and a case where the specific condition has been already satisfied at a timing when the third condition (the main R restrain control performing condition in the present embodiment) becomes satisfied, the main R restrain control is performed. Therefore, safety at the reverse timing can be ensured.

From the above description, according to the third embodiment apparatus, a possibility that the travelling performance of the vehicle is degraded can be reduced as well as safety at the reverse timing can be ensured.

The driving force control apparatuses according to the embodiments of the present invention have been described. However, the present invention is not limited to the aforementioned embodiments and may adopt various modifications within a scope of the present invention.

For example, the driving force control apparatus may comprise a VSC (Vehicle Stability Control) off SW in place of the TRC off SW 18. The VSC off SW is a switch for invalidating a function of vehicle behavior stabilization control. In this case, the specific condition becomes satisfied when the VSC off SW has changed from the non-pressed state to the pressed state. In addition, the driving force control apparatus may comprise an L4 SW in place of the TRC off SW 18. The L4 SW is a switch for setting a sub transmission to a low gear side. In this case, the specific condition becomes satisfied when the L4 SW has changed from the non-pressed state to the pressed state. Further, the driving force control apparatus may comprise more than or equal to two switches among the TRC off SW 18, the VSC off SW, and the L4 SW. In this case, the specific condition becomes satisfied when any one of these switches has changed from the non-pressed state to the pressed state.

In addition, a magnitude relation of the first vehicle speeds V1R and V1S and a magnitude relation of the second vehicle speeds V2R and V2S in each target acceleration look-up table are not limited to the magnitude relations stated above. For example, relations such as V1R>V1S, V2R>V2S may be adopted.

It should be noted that in the present embodiments, a relationship of "R target acceleration GtgtR>SC target acceleration GtgtS" is always satisfied in a range where the vehicle speed is more than or equal to zero and less than the second vehicle speed V2R (=V2S). However, a configuration is not limited thereto. For example, a following configuration may be adopted, the configuration being a configuration where the relationship of "R target acceleration GtgtR>SC target acceleration GtgtS" is satisfied only in a certain vehicle speed range and a relationship of "SC target acceleration GtgtS≥R target acceleration GtgtR" is satisfied in the rest of the vehicle speed range.

The invention claimed is:

1. A driving force control apparatus comprising:
a driving force generating apparatus configured to generate driving force applied to a vehicle; and
a controller configured to control said driving force by controlling said driving force generating apparatus, wherein,
said controller is configured to
start shift-change-timing restrain control to control said driving force generating apparatus in such a manner that said driving force generating apparatus generates driving force at a timing when a starting condition becomes satisfied, said driving force being obtained by adding a limit to an operation driving force determined based on an operation amount of an accelerator pedal of said vehicle so that said operation driving force does not exceed a shift-change-timing target driving force, wherein said starting condition includes a condition that a shift position of said vehicle has changed in accordance with a predetermined pattern, including a pattern where said shift position changes from a position other than a reverse position to said reverse position in a case when said accelerator pedal is in an operating state and a pattern where said shift position changes from a position other than a driving position to said driving position in a case when said accelerator pedal is in said operating state, perform reverse-timing restrain control to control said driving force generating apparatus in such a manner that said driving force generating apparatus generates driving force when a performing condition is satisfied, said driving force being obtained by adding a limit to said operation driving force so that said operation driving force does not exceed a reverse-timing target driving force, wherein said performing condition includes a condition that said accelerator pedal is in said operating state as well as said shift position is in said reverse position, when a predetermined specific operation is performed by a driver of said vehicle, said specific operation being other than an operation of said accelerator pedal in a case when said shift-change-timing restrain control is being performed, moderate a degree of said limitation to said operation driving force in said shift-change-timing restrain control by increasing said shift-change-timing target driving force or stopping said shift-change-timing restrain control, and when said specific operation is performed by said driver in a case when said reverse-timing restrain control is being performed, maintain a degree of said limitation to said operation driving force in said reverse-timing restrain control.

2. The driving force control apparatus according to claim 1, wherein, said controller is configured to stop said shift-change-timing restrain control when said specific operation is performed in a case when both of said shift-change-timing restrain control and said reverse-timing restrain control are being performed, and said controller is further configured to:

calculate said operation driving force as a target operation driving force;

calculate said shift-change-timing target driving force using a parameter indicating an acceleration condition of said vehicle;

calculate said reverse-timing target driving force using said parameter;

when both of said shift-change-timing restrain control and said reverse-timing restrain control are being performed, select a smallest driving force as a final target driving force, said smallest driving force being selected from among said target operation driving force, said shift-change-timing target driving force, and said reverse-timing target driving force;

when said reverse-timing target driving force is larger than said shift-change-timing target driving force at a switching timing at which said specific operation has been performed, calculate a gradual change target driving force which gradually increases from said shift-change-timing target driving force at said switching timing with a lapse of time and during a period from said switching timing to a reaching timing at which said gradual change target driving force has reached said reverse-timing target driving force successively calculated using said parameter, and select a smaller driving force among said target operation driving force and said gradual change target driving force as said final target driving force;

after said reaching timing, select smaller driving force as final target driving force, said smaller driving force being selected from among said target operation driving force and said reverse-timing target driving force successively calculated using said parameter; and control said driving force generating apparatus in such a manner that driving force generated by said driving force generating apparatus matches with said selected final target driving force.

3. The driving force control apparatus according to claim 2, wherein, said controller is configured to:

calculate driving force as said shift-change-timing target driving force in accordance with feedback control where first control gains are used, said driving force applied to said vehicle in order to match an actual value of said parameter with a shift-change-timing target parameter calculated in said shift-change-timing restrain control;

calculate driving force as said reverse-timing target driving force in accordance with feedback control where second control gains are used, said driving force applied to said vehicle in order to match an actual value of said parameter with a reverse-timing target parameter calculated in said reverse-timing restrain control; and when said shift-change-timing target parameter and said reverse-timing target parameter are equal with each other in a case when said reverse-timing target driving force is less than or equal to said shift-change-timing target driving force at said switching timing, calculate driving force as said reverse-timing target driving force in accordance with feedback control where said first control gains are used in place of said second control gains, said driving force applied to said vehicle in order to match said actual value of said parameter with said reverse-timing target parameter after said switching timing.

* * * * *